(12) United States Patent
Dietz et al.

(10) Patent No.: US 12,440,822 B1
(45) Date of Patent: Oct. 14, 2025

(54) CARBON SORBENT FORMULATIONS FOR CARBON DIOXIDE ADSORPTION, AND RELATED METHODS

(71) Applicants: Schlumberger Technology Corporation, Sugar Land, TX (US); TDA Research, Inc., Golden, CO (US)

(72) Inventors: Steven Dean Dietz, Denver, CO (US); Ambalavanan Jayaraman, Highlands Ranch, CO (US); Gokhan Omer Alptekin, Boulder, CO (US)

(73) Assignees: Schlumberger Technology Corporation, TX (US); TDA Research, Inc., Golden, CO (US)

( * ) Notice: Subject to any disclaimer, the term of this patent is extended or adjusted under 35 U.S.C. 154(b) by 0 days.

(21) Appl. No.: 18/666,451

(22) Filed: May 16, 2024

(51) Int. Cl.
| | | |
|---|---|---|
| *B01J 20/22* | (2006.01) | |
| *B01D 53/02* | (2006.01) | |
| *B01J 20/28* | (2006.01) | |
| *B01J 20/30* | (2006.01) | |
| *C01B 32/30* | (2017.01) | |
| *C01B 32/312* | (2017.01) | |
| *C01B 32/318* | (2017.01) | |

(52) U.S. Cl.
CPC ............. *B01J 20/22* (2013.01); *B01D 53/02* (2013.01); *B01J 20/28061* (2013.01); *B01J 20/28064* (2013.01); *B01J 20/28083* (2013.01); *B01J 20/3007* (2013.01); *B01J 20/3078* (2013.01); *B01D 2253/20* (2013.01); *B01D 2253/306* (2013.01); *B01D 2253/308* (2013.01); *B01D 2257/504* (2013.01); *C01B 32/30* (2017.08); *C01B 32/312* (2017.08); *C01B 32/318* (2017.08)

(58) Field of Classification Search
None
See application file for complete search history.

(56) References Cited

U.S. PATENT DOCUMENTS

| | | | |
|---|---|---|---|
| 7,167,354 | B2 | 1/2007 | Dietz et al. |
| 7,541,312 | B2 | 6/2009 | Dietz et al. |
| 9,120,079 | B1 * | 9/2015 | Dietz ................ B01D 53/02 |
| 10,256,050 | B2 | 4/2019 | Mitlin |

(Continued)

OTHER PUBLICATIONS

Sevilla et al ("N-Doped Polypyrrole-Based Porous Carbons for CO2 Capture", Adv. Funct. Mater. (2011), 21, 2781-2787). (Year: 2011).*

(Continued)

*Primary Examiner* — Michael Forrest
(74) *Attorney, Agent, or Firm* — Stephen M. Cordes

(57) ABSTRACT

A carbon sorbent for removing carbon dioxide from a gaseous material includes a surface composition including carbon, nitrogen, and oxygen. The nitrogen atoms at the surface of the carbon sorbent may be present in pyridone, pyrrole, and pyridine. The surface of the carbon sorbent may include lactone groups and pyrone groups. The carbon sorbent may have a bulk density greater than about 0.40 grams per cubic centimeter. The carbon sorbent may be formed using amino acids to provide the nitrogen for the carbon sorbent. In addition, the use of processing aids during the formation of the carbon sorbent facilitates the formation of a denser carbon sorbent. Related methods of forming the carbon sorbent and pellets of the carbon sorbent are also disclosed.

14 Claims, 12 Drawing Sheets

(56) References Cited

U.S. PATENT DOCUMENTS

| | | |
|---|---|---|
| 11,077,421 B2 | 8/2021 | Srinivas |
| 2004/0124152 A1 | 7/2004 | Baker |
| 2013/0168321 A1 | 7/2013 | Cannon |
| 2015/0283534 A1 | 10/2015 | Costantino |
| 2020/0009532 A1 | 1/2020 | Olson |
| 2022/0234893 A1 | 7/2022 | Dietz |
| 2024/0343581 A1 | 10/2024 | Kanno |

OTHER PUBLICATIONS

Office Action issued in U.S. Appl. No. 18/666,544 dated Jan. 15, 2025, 14 pages.
Office Action issued in U.S. Appl. No. 18/666,511 dated Aug. 7, 2024, 12 pages.

\* cited by examiner

CARBON SORBENT FORMULATIONS FOR CARBON DIOXIDE ADSORPTION, AND RELATED METHODS

CROSS REFERENCE TO RELATED APPLICATIONS

N/A.

BACKGROUND

Carbon dioxide emissions are a significant contributor to greenhouse gases. For example, byproducts of fossil fuel combustion include carbon dioxide ($CO_2$) and other greenhouse gas emissions. The electric power generation industry is one of the largest $CO_2$ emitters. During the combustion of fossil fuels, such as in electric power plants for the generation of electricity, flue gas from a furnace, boiler, or engine is emitted through one or more stacks to the atmosphere. The flue gas includes one or more pollutants, such as nitrogen, oxygen, water vapor, carbon dioxide, and other pollutants, including sulfur oxides, nitrogen oxides, and particulate matter. Carbon dioxide is also present in natural gas or biogas generated from anaerobic digesters. The $CO_2$ is conventionally removed from such materials to increase the concentration of methane for subsequent use.

Carbon capture and storage (CCS) involves capturing carbon dioxide from large point sources, such as power plants, and storing it underground or using it for other purposes, such as enhanced oil recovery or chemical production. CCS can help reduce greenhouse gas emissions and mitigate climate change. Methods of CSS include $CO_2$ separation from other materials (e.g., post-combustion gases, natural gas, biogas, or other sources), such as by chemical and physical solvent processes, chemical absorption, physical absorption, membrane separation with $CO_2$ selective membranes, and cryogenic methods. However, such methods of $CO_2$ separation are energy intensive. For example, chemical absorption includes absorbing the $CO_2$ in an aqueous solution including an alkanolamine (e.g., monoethanolamine (MEA), diethanolamine (DEA), methyldiethanolamine (MDEA)) to form a $CO_2$-amine complex and subsequently releasing the absorbed $CO_2$ from the $CO_2$-amine complex via steam stripping during a regeneration process. In addition, such systems for $CO_2$ separation require large capital expenses to construct. Chemical and physical solvent processes, physical absorption, membrane separation, and cryogenic methods of separation are also costly.

Other methods of $CO_2$ capture include pressure swing adsorption (PSA) and vacuum swing adsorption (VSA). Such methods use physical adsorbents, such as zeolites, carbon molecular sieves, or activated carbons, for capturing the $CO_2$. However, many adsorbents are not well suited from $CO_2$ capture from streams including methane because they do not exhibit a high selectivity of $CO_2$ relative to water vapor, and such streams often include a significant amount of water vapor.

BRIEF SUMMARY

In some embodiments, a carbon sorbent for removal of carbon dioxide from a gaseous material comprises a carbon content of at least about 90.0 atomic percent at a surface of the carbon sorbent and a nitrogen content of at least about 2.0 atomic percent at the surface of the carbon sorbent, the carbon content and the nitrogen content exclusive of hydrogen. At least 70 atomic percent of the nitrogen at the surface of the carbon sorbent comprises at least one of pyridone or pyrrole. At least some of the nitrogen at the surface of the carbon sorbent comprises pyridine.

In some embodiments, a carbon sorbent for removal of carbon dioxide from a gaseous material comprises at least 2.0 atomic percent nitrogen at a surface of the carbon sorbent, a ratio of pyridone and pyrrole to pyridine at the surface greater than about 2.0:1.0. The carbon sorbent comprises at least 3.0 atomic percent oxygen at the surface and greater than about 2.0 atomic percent of carbon atoms of the carbon sorbent at the surface double bonded to an oxygen atom and single bonded to one of another oxygen atom or a nitrogen atom. The atomic percent of nitrogen and the atomic percent of oxygen are exclusive of hydrogen at the surface of the carbon sorbent.

In some embodiments, a carbon sorbent for removal of carbon dioxide from a gaseous material comprises a surface including carbon, nitrogen, and oxygen, greater than two-thirds of nitrogen atoms at the surface of the carbon sorbent comprising a portion of at least one of pyridone structures or pyrrole structures. More than about 5.0 atomic percent of carbon atoms on the surface including conjugated pi-pi bonds. An oxygen content at the surface, exclusive of hydrogen, is at least about 4.0 weight percent.

In some embodiments, a carbon sorbent for removal of carbon dioxide from a gaseous material comprises a surface of the carbon sorbent comprising greater than about 90.0 atomic percent carbon, greater than about 2.0 atomic percent nitrogen, and greater than about 5.0 atomic percent oxygen, and at least some lactone rings at the surface of the carbon sorbent. The atomic percent of carbon, the atomic percent of nitrogen, and the atomic percent of oxygen are exclusive of hydrogen.

Additional embodiments include a carbon sorbent for removal of carbon dioxide from a gaseous material, the carbon sorbent comprising a surface comprising a carbon content of at least about 90.0 atomic percent and a nitrogen content of at least about 2.0 atomic percent content exclusive of hydrogen, and a carbon dioxide capacity greater than about 10.0 weight percent when measured at about 60° C. and a pressure of about 760 mmHg.

In some embodiments, a carbon sorbent for removal of carbon dioxide from a gaseous material comprises at least about 2.0 atomic percent nitrogen atoms, exclusive of hydrogen, at a surface of the carbon sorbent, at least about 70 atomic percent of nitrogen atoms at the surface of the carbon sorbent in at least one of a pyridone structure or a pyrrole structure, and less than about 70 atomic percent of carbon atoms of the carbon sorbent comprise carbon to carbon bonds, carbon to hydrogen bonds, carbon to sulfur bonds, or carbon to phosphorus bonds. Greater than about 40.0 atomic percent of oxygen atoms at the surface of the carbon sorbent are double bonded to a carbon atom.

In other embodiments, a method of forming a carbon sorbent comprises mixing one or more carbohydrates, corn starch, and at least one amino acid with water to form a slurry, forming green pellets from the slurry, and exposing the green pellets to a temperature greater than about 400° C. to carbonize the green pellets and form pellets comprising the carbon sorbent.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
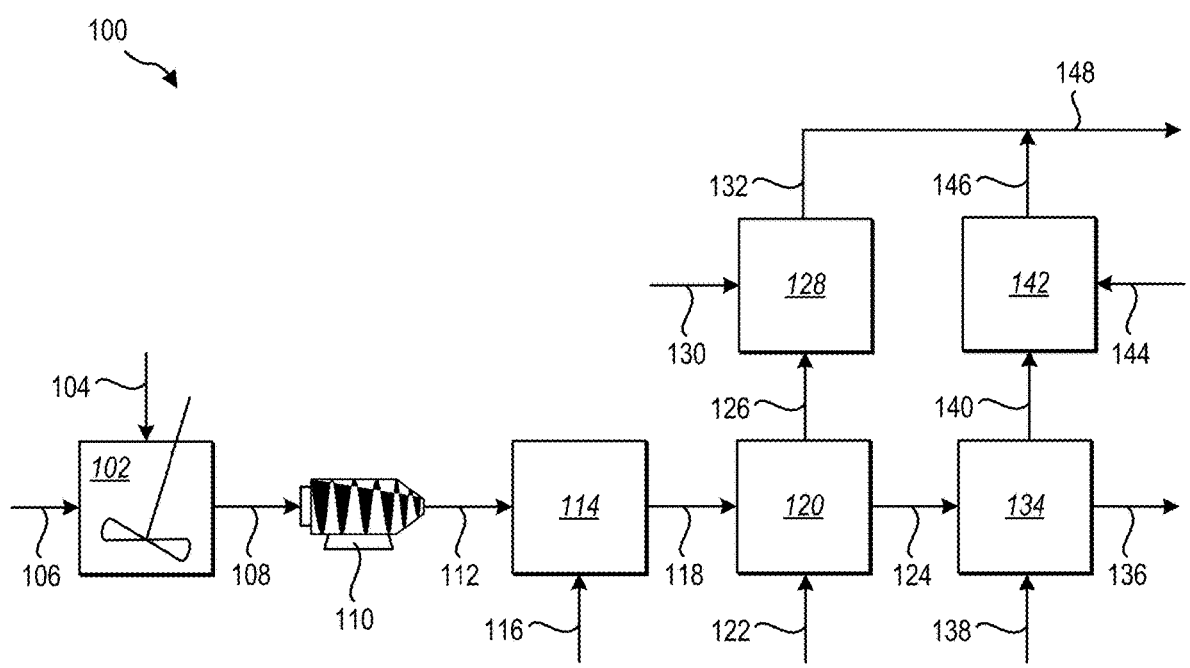
FIG. 1 is a simplified schematic illustrating a system for forming a carbon sorbent, according to at least one embodiment of the disclosure.

As used herein, a "mesoporous" material means and includes a material having pores including pores within a range of from about 2 nm about 50 nm, according to the International Union of Pure and Applied Chemistry (IUPAC) nomenclature. As used herein a "microporous" material means and includes a material having pores smaller than about 2 nm.

This disclosure generally relates to carbon sorbent formulations formulated and configured for physically adsorbing $CO_2$ from one or more gas streams (gaseous materials), such as a post-combustion gas stream (e.g., a flue gas). In some embodiments, the carbon sorbent is formulated and configured to selectively capture carbon dioxide by physical adsorption. The carbon sorbent may include a mesoporous material and may be formed of and include carbon, nitrogen, and oxygen. The carbon sorbent may be referred to herein as a "mesoporous carbon sorbent." The carbon sorbent may include one or more additional elements, such as phosphorous or sulfur. In some embodiments, the carbon sorbent is pelletized and configured for use in a pressure swing adsorption system or a vacuum swing adsorption system for selectively capturing $CO_2$ from a gas stream, such as a post-combustion gas stream.

The atomic percent of the different elements of the carbon sorbent, the distribution thereof, and the types of bonds of the carbon sorbent may affect the $CO_2$ capacity (also referred to herein as "$CO_2$ loading") of the carbon sorbent. In particular, the composition of the carbon sorbent at the surface of the carbon sorbent may affect the physical adsorption properties thereof. The surface of the carbon sorbent may include nitrogen atoms covalently bonded to carbon atoms, such as to or within carbon ring structures at the surface of the carbon sorbent. In some embodiments, the surface of the carbon sorbent includes greater than about 2.0 atomic percent nitrogen, which may facilitate increasing the selectivity of the carbon sorbent to carbon dioxide relative to water and other materials that may be present in a $CO_2$-containing stream. The surface of the carbon sorbent may include greater than about 90.0 atomic percent carbon, greater than about 2.0 atomic percent nitrogen, and greater than about 4.0 atomic percent oxygen, the atomic percents exclusive of hydrogen.

In some embodiments, the nitrogen atoms at the surface of the carbon sorbent are part of a pyridone structure, a pyrrole structure, or a pyridine structure. The surface of the carbon sorbent may include a ratio of pyridine and/or pyrrole to pyridine of at least about 2.0:1.0, such as greater than about 2.5:1.0. At least about 2.0 times more of the nitrogen atoms at the surface may be part of pyridone and/or pyrrole structures than of a pyridine structures. In addition, the surface of the carbon sorbent may include at least some carbon atoms that are double bonded to an oxygen atom and also single bonded to one of a nitrogen atom or another oxygen atom (e.g., the surface of the carbon sorbent may include one or both of O—C=O bonds or N—C=O bonds). In some embodiments, the surface of the carbon sorbent includes at least some lactone structures (e.g., lactone rings). In some embodiments, less than about 65 atomic percent of the carbon atoms at the surface of the carbon sorbent are part of carbon-to-carbon single bonds (C—C bonds), carbon-to-hydrogen single bonds (C—H bonds), carbon-to-sulfur single bonds (C—S bonds), or carbon-to-phosphorus single bonds (C—P bonds). In addition, at least 10.0 atomic percent of the carbon atoms at the surface of the carbon sorbent may be conjugated (e.g., participate in $\pi$-$\pi$ bonding).

The carbon sorbent may exhibit a bulk density greater than a bulk density of conventional carbon sorbent materials. The relatively higher bulk density of the carbon sorbent may facilitate improved $CO_2$ capture by the carbon sorbent compared to a same volume of a conventional carbon sorbent. The bulk density of the carbon sorbent may be greater than about 0.40 g/cm³, such as greater than about 0.45 g/cm³, or even greater than about 0.50 g/cm³.

The carbon sorbent may be formulated and configured to exhibit one or more desirable properties with respect to capture of $CO_2$. For example, a $CO_2$ capacity of the carbon sorbent may be relatively higher than a $CO_2$ capture of conventional carbon sorbent materials under similar conditions (e.g., temperature, pressure, and gas composition). In addition, a selectivity of the carbon sorbent to $CO_2$ relative to water vapor may be higher than conventional carbon sorbent materials. In other words, a ratio of $CO_2$ adsorbed to water adsorbed by the carbon sorbent may be greater than the ratio of $CO_2$ adsorbed to water adsorbed of conventional carbon sorbent materials. For conditions of about 60° C., the selectivity of the carbon sorbent to $CO_2$ relative to nitrogen gas ($N_2$) may be greater than about 11.0:1.

The carbon sorbent may be formed by mixing water with one or more carbohydrates (e.g., sugars), such as one or more of dextrose (glucose), fructose, or sucrose, with corn starch, a nitrogen-containing material, and optionally, a processing aid to form a slurry. The slurry may be extruded through an extruder to form green pellets of the slurry. The green pellets may be exposed to a first temperature to at least partially remove the water from the dry green pellets, followed by exposure to a second temperature to decompose the materials of the dried pellets and carbonize the dried pellets. The carbonized dried pellets may include carbon sorbent comprising a mesoporous carbon char. The carbon sorbent may be activated with one or more activators to increase the surface area of the carbon sorbent.

The nitrogen-containing material may affect the nitrogen content and the properties (e.g., the $CO_2$ capacity, the selectivity of the carbon sorbent to $CO_2$) of the carbon sorbent. In addition, without being bound by any particular theory, it is believed that the processing aid facilitates forming the green pellets to have a higher density, facilitating forming the carbon sorbent to exhibit a relatively higher density than carbon sorbents formed without the processing aids.

FIG. 1 is a simplified schematic illustrating a system 100 for forming a carbon sorbent, according to at least one embodiment of the disclosure. With reference to FIG. 1, the system 100 includes a mixer 102 configured to receive a feed material 104 and an aqueous material 106 to form a slurry 108. The mixer 102 may be configured to mix the components of the feed material 104 and the aqueous material 106. The aqueous material 106 may include, for example, water. In some embodiments, the aqueous material 106 includes one or more acids, such as sulfuric acid. The mixer 102 may include a V-shell mixer (also referred to as a "V-shaped mixer" or a "V-shaped blender"), an incline mixer, a static mixer, a powder induction system, an in-tank mixer, or another type of mixer. In some embodiments, the mixer 102 includes a V-shell mixer.

The feed material 104 may include one or more carbohydrates (e.g., one or more sugars), starch, a nitrogen-containing material, and optionally, a processing aid. The one or more carbohydrates may include one or more of a monosaccharide (e.g., one or more of glucose, fructose, or galactose; also referred to as a "hexose" having the formula $C_6H_{12}O_6$), a disaccharide (e.g., one or more of sucrose, lactose, or maltose), or a polysaccharide (e.g., in addition to the starch, such as cellulose or glycogen). In some embodiments, the one or more carbohydrates includes sucrose.

The starch may include at least one naturally occurring polymer found in plant cells and in some microorganisms. By way of non-limiting example, the starch may include at least one of corn starch, potato starch, tapioca starch, wheat starch, maize starch, rice starch, sago starch, sorghum starch, pea starch, roots containing a high starch content, etc. In some embodiments, the starch includes corn starch. However, the disclosure is not so limited, and the starch may include a different type of starch. In some embodiments, the starch includes at least about 80 percent by weight of amylopectin, such as at least about 85 percent by weight, at least about 90 percent by weight, or even at least about 95 percent by weight of amylopectin.

The nitrogen-containing material may include one or more of an amino acid (e.g., glycine), melamine, urea, ammonium bicarbonate, ammonium sulfate, cetyltrimethylammonium bromide, ammonium citrate, ammonium oxalate, ammonium formate, ammonium hydrogen citrate, ammonium hydrogen oxalate, ammonium chloride, ammonium bromide, ammonium phosphate, guanidine carbonate, thiourea, ammonium thiocyanate, or combinations thereof. In some embodiments, the nitrogen-containing material includes one or more amino acids, such as one or more of glycine, alanine, arginine, asparagine, aspartic acid, cysteine, glutamic acid, glutamine, histidine, isoleucine, leucine, lysine, methionine, phenylalanine, proline, serine, threonine, tryptophan, tyrosine, valine, or combinations thereof. In some embodiments, the nitrogen-containing material includes, consists essentially of, or consists of one or more amino acids. In some embodiments, the nitrogen-containing material includes, consists essentially of, or consists of guanidine carbonate.

In some embodiments, the nitrogen-containing material compound includes a non-polar amino acid, such as one or more of glycine, methionine, or valine. In some embodiments, the nitrogen-containing material includes, consists essentially of, or consists of glycine. The nitrogen-containing material may include an amine amino acid, such as lysine. In some embodiments, the nitrogen-containing material includes a hydroxy amino acid, such as threonine. In some embodiments, the nitrogen-containing material also includes sulfur, such as methionine, thiourea, or ammonium thiocyanate.

The nitrogen-containing material may include one or more amine groups bonded to a carboxyl group (e.g., a —COOH group). For example, the nitrogen-containing material may include one or more primary amines bonded to a carboxyl group. In some such embodiments, the nitrogen-containing material may have the general formula $NH_2$—R—COOH or $NH_2$—COOH, wherein R is an organyl group (e.g., one or more of an acyl group, an alkyl group, an alkenyl group, an alkynyl group, a benzyloxycarbonyl group, a tert-butoxycarbonyl group, a carboxyl group, another amine group, an amide group, or combinations thereof).

As described in additional detail herein, the nitrogen-containing material may affect one or more of the nitrogen content of a carbon sorbent material formed from the feed material 104, the type of nitrogen bonds in the carbon sorbent (e.g., whether the carbon sorbent includes pyridones, pyrroles, pyridines, and/or pyrones), the $CO_2$ capacity of the carbon sorbent, or the selectivity of the carbon sorbent to $CO_2$ relative to other materials (e.g., water, nitrogen, oxygen).

The processing aid may be formulated and configured to facilitate lubrication and binding of the materials in the feed material 104. The processing aid may facilitate forming green pellets 112 of the slurry 108 to exhibit a higher density compared to pellets formed without the processing aid. Without being bound by any particular theory, it is believed that the processing aid facilitates lubrication of particles of the feed material 104, allowing for a higher compaction and density of the slurry 108 during, for example, an extrusion process to form the green pellets 112.

The processing aid may include one or more of carboxymethylcellulose (CMC), methyl cellulose, hydroxypropyl methylcellulose (HPMC), a hydrocarbon, a fluorocarbon, a stearate, another processing aid, or combinations thereof. In some embodiments, the processing aid includes a polymer (e.g., a homopolymer, a copolymer, a terpolymer) of one or more of CMC, methyl cellulose, HPMC, or combinations thereof. In some embodiments, the processing aid comprises, consists essentially of, or consists of CMC. In some embodiments, the processing aid includes Methocel®, commercially available from ChemPoint of Bellevue, Washington.

The aqueous material 106 may include one or more acids formulated and configured to facilitate acid hydrolysis of the one or more carbohydrates in the feed material 104, such as when the one or more carbohydrates includes a disaccharide (e.g., sucrose, lactose, maltose) or a polysaccharide. The one or more acids may include sulfuric acid. In some embodiments, the one or more carbohydrates includes a disaccharide (e.g., sucrose) and/or a polysaccharide and the one or more acids includes sulfuric acid. The sulfuric acid may facilitate acid hydrolysis of the carbohydrates to one or more hexoses (e.g., glucose and fructose). The one or more acids may further hydrolyze the one or more hexoses to form 5-hydroxymethylfurfural, levulinic acid, formic acid, and water.

A weight percent of the one or more carbohydrates in the feed material 104 (and not including the aqueous material 106) may be within a range of from about 30 weight percent to about 80 weight percent, such as from about 30 weight percent to about 40 weight percent, from about 40 weight percent to about 50 weight percent, from about 50 weight percent to about 60 weight percent, from about 60 weight percent to about 70 weight percent, or from about 70 weight percent to about 80 weight percent. In some embodiments, a weight percent of the one or more carbohydrates in the feed material 104 is within a range of from about 30 weight percent to about 40 weight percent, such as from about 35 weight percent to about 40 weight percent.

A weight percent of the starch in the feed material 104 may be within a range of from about 20 weight percent to about 70 weight percent, such as from about 20 weight percent to about 30 weight percent, from about 30 weight percent to about 40 weight percent, from about 40 weight percent to about 50 weight percent, from about 50 weight percent to about 60 weight percent, or from about 60 weight percent to about 70 weight percent. In some embodiments, a weight percent of the starch in the feed material 104 is within a range of from about 50 weight percent to about 60 weight percent, such as from about 55 weight percent to about 60 weight percent. In some embodiments, the feed material 104 includes a greater weight percent of the starch than of the one or more carbohydrates. In other embodiments, the feed material 104 includes a greater weight percent of the one or more carbohydrates than of the starch.

A weight percent of the nitrogen-containing material in the feed material 104 may be within a range of from about 2.0 weight percent to about 10.0 weight percent, such as from about 2.0 weight percent to about 3.0 weight percent, from about 3.0 weight percent to about 4.0 weight percent, from about 4.0 weight percent to about 5.0 weight percent, from about 5.0 weight percent to about 6.0 weight percent, from about 6.0 weight percent to about 8.0 weight percent, or from about 8.0 weight percent to about 10.0 weight percent. In some embodiments, a weight percent of the nitrogen-containing material in the feed material 104 is within a range of from about 2.0 weight percent to about 3.0 weight percent, such as from about 2.5 weight percent to about 3.0 weight percent.

A weight percent of the processing aid in the feed material 104 may be within a range of from about 1.0 weight percent to about 5.0 weight percent, such as from about 1.0 weight percent to about 2.0 weight percent, from about 2.0 weight percent to about 3.0 weight percent, from about 3.0 weight percent to about 4.0 weight percent, or from about 4.0 weight percent to about 5.0 weight percent. In some embodiments, a weight percent of the processing aid in the feed material 104 is within a range of from about 2.0 weight percent to about 3.0 weight percent, such as from about 2.5 weight percent to about 3.0 weight percent. In some embodiments, the processing aid constitutes about 2.8 weight percent of the feed material 104.

A ratio of the nitrogen-containing material to the processing aid in the feed material 104 may be within a range of from about 0.5:1.0 to about 2.0:1.0, such as from about 0.5:1.0 to about 0.75:1.0, from about 0.75:1.0 to about 1.0:1.0, from about 1.0:1.0 to about 1.5:1.0, or from about 1.5:1.0 to about 2.0:1.0. In some embodiments, the ratio of the nitrogen-containing material to the processing aid in the feed material 104 is from about 0.75:1.0 to about 1.0:1.0. In some embodiments, the feed material 104 includes a greater weight percent of the processing aid than of the nitrogen-containing material.

A ratio of the processing aid to the one or more carbohydrates in the feed material 104 may be within a range of from about 1.0:10 to about 1.0:20, such as from about 1.0:10 to about 1.0:15.0, or from about 1.0:15 to about 1.0:20. A ratio of the processing aid to the starch may be within a range of from about 1.0:20 to about 1.0:30, such as from about 1.0:20 to about 1.0:25, or from about 1.0:25 to about 1.0:30. However, the disclosure is not so limited, and the ratio of the processing aid to each of the one or more carbohydrates and the starch may be different than that described.

Although the system 100 has been described and illustrated as including the feed material 104 including each of the one or more carbohydrates, the starch, the nitrogen-containing material, and the processing aid together in the feed material 104, the disclosure is not so limited. In some embodiments, one or more of (e.g., each of) the one or more carbohydrates, the starch, the nitrogen-containing material, and the processing aid may be provided to the mixer 102 separately. For example, the processing aid may be provided to the mixer 102 separately from the one or more carbohydrates, the starch, and the nitrogen-containing material.

A weight percent of water in the slurry 108 (which includes the aqueous material 106 and the feed material 104) may be within a range of from about 10 weight percent to about 20 weight percent, such as from about 10 weight percent to about 15 weight percent, or from about 15 weight percent to about 20 weight percent. However, the disclosure is not so limited, and the weight percent of water in the slurry 108 may be different than that described. The water may be provided to the slurry 108 by the aqueous material 106.

The slurry 108 may include reaction products of the feed material 104 and the aqueous material 106. In some embodiments, the slurry 108 includes acid hydrolysis reaction products of one or more components of the feed material 104 (e.g., the one or more carbohydrates) and an acid (e.g., from the aqueous material 106). For example, the slurry 108 may include at least 5-hydroxymethylfurfural and levulinic acid.

The slurry 108 may be provided to an extruder 110 configured to form the green pellets 112 from the slurry 108 and provide the green pellets 112 to an oven 114. The extruder 110 may include, for example, a single screw extruder, a twin-screw extruder, a drum extruder, a ram extruder (also referred to as a plunger extruder), a disk extruder, or another type of extruder. In some embodiments, the extruder 110 includes a screw extruder (e.g., a single screw extruder).

An end of the extruder 110 may include a die plate defining an orifice through which the slurry 108 is extruded. A dimension (e.g., a diameter) of the orifice of the die plate may define a dimension (e.g., a diameter) of the green pellets 112. In some embodiments, a diameter of the orifice may be within a range of from about 0.80 mm (about 0.03125 inch) to about 3.175 mm (about 0.125 inch), such as from about 0.80 mm (about 0.03125 inch) to about 1.588 mm (about 0.0625 inch), or from about 1.588 mm (about 0.0625 inch) to about 3.175 mm (about 0.125 inch). In some embodiments, the diameter of the die plate (and the corresponding diameter of the green pellets 112) is about 1.588 mm (about 0.0625 inch). In some embodiments, the diameter of the die plate and the pellets 112 is about 3.175 mm (about 0.125 inch).

Upon extrusion through the die plate of the extruder 110, the green pellets 112 may be formed by cutting the extrudate or by breaking of the extrudate after a predetermined length of the extrudate has passed through the orifice. The green pellets 112 may have a cylindrical shape, which may have a diameter defined by the diameter of the die plate and a length defined by the length of the extrudate prior to cutting or breaking. In other embodiments, the green pellets 112 have a shape other than cylindrical, such as spherical or another shape.

After forming the green pellets 112, the green pellets 112 may be provided to the oven 114 (e.g., a drying oven) where the green pellets 112 are exposed to air 116 at a temperature to at least partially dry the green pellets 112 and form dried pellets 118. At least some of the water from the slurry 108 may be removed from the green pellets 112 to form the dried pellets 118. In some embodiments, substantially all (e.g., greater than 95%, greater than 99%, greater than 99.9%, greater than 99.99%) of the water is removed from the green pellets 112 and the dried pellets 118 are substantially free of water. Removing the water from the green pellets 112 may at least partially shrink the dried pellets 118 such that the dried pellets 118 have a size (e.g., a diameter, a length) smaller than a size (e.g., a diameter, a length) of the green pellets 112.

The temperature of the oven 114 may be within a range of from about 100° C. to about 140° C., such as from about 100° C. to about 120° C., or from about 120° C. to about 140° C. In some embodiments, such as when the nitrogen-containing material includes an amino acid, the temperature of the oven 114 is about 110° C. However, the disclosure is not so limited, and the temperature of the oven 114 may be different than that described. The air 116 may be air from a surrounding environment. The air 116 may be provided substantially continuously or intermittently while the green pellets 112 are dried in the oven 114.

The green pellets 112 may remain in the oven 114 for a duration (e.g., referred to as a residence time). The duration may be based, at least in part, on the water content of the green pellets 112 and the temperature of the oven 114. In some embodiments, a residence time of the green pellets 112 in the oven 114 is within a range of from about 12 hours to about 36 hours, such as from about 12 hours to about 18 hours, from about 18 hours to about 24 hours, from about 24 hours to about 30 hours, or from about 30 hours to about 36 hours. However, the residence time of the green pellets 112 may be different than that described.

Responsive to forming the dried pellets 118, the dried pellets 118 are provided to a first furnace 120, where the dried pellets 118 are exposed to an inert stream 122 and heated to a second temperature to form carbon sorbent pellets 124 (which may also be referred to as "carbonized pellets") and volatile materials 126. The temperature of the first furnace 120 may be higher than the temperature of the oven 114 and may be within a range of from about 350° C. to about 450° C., such as from about 350° C. to about 400° C., or from about 400° C. to about 450° C. In some embodiments, the temperature of the first furnace 120 is about 400° C. However, the disclosure is not so limited, and the temperature of the first furnace 120 may be higher than about 450° C., such as higher than about 600° C., higher than about 700° C., or higher than about 800° C.

The inert stream 122 may be substantially free of oxygen. In some embodiments, the inert stream 122 is substantially free of an oxidizer. In some embodiments, the inert stream 122 includes an anoxic material (e.g., the inert stream 122 is substantially free of oxygen, such as oxygen gas ($O_2$)). In some embodiments, the inert stream 122 include a reducing gas, such as hydrogen ($H_2$). The inert stream 122 may include, for example, nitrogen gas, argon, helium, hydrogen, or combinations thereof. In some embodiments, the inert stream 122 includes nitrogen.

The first furnace 120 may include a rotary furnace (also referred to as a "rotary kiln"), a continuous furnace, a shaft furnace, or another type of furnace. In some embodiments, the first furnace 120 includes a rotary furnace.

In some embodiments, a flowrate of the dried pellets 118 to the first furnace 120 is substantially the same as the flowrate of the green pellets 112 to the oven 114, such that the volume of the green pellets 112 in the oven 114 remains substantially constant. An average residence time of the dried pellets 118 in the first furnace 120 may be within a range of from about 30 minutes to about 90 minutes, such as from about 30 minutes to about 45 minutes, from about 45 minutes to about 60 minutes, from about 60 minutes to about 75 minutes, or from about 75 minutes to about 90 minutes. In some embodiments, the average residence time of the dried pellets 118 in the first furnace 120 is about 60 minutes.

The dried pellets 118 may be provided to the first furnace 120 substantially continuously. In some embodiments, for every about 1,000 kg of the feed material 104, a flowrate of the dried pellets 118 to the first furnace 120 may be within a range of from about 0.5 kg/hr to about 2.0 kg/hr. However, the disclosure is not so limited, and the flowrate of the dried pellets 118 to the first furnace 120 may depend on one or more of the temperature of the oven 114, the composition of the feed material 104, the temperature of the first furnace 120, or combinations thereof.

A flowrate of the inert stream 122 to the first furnace 120 may be within a range of from about 5 L/min to about 15 L/min for every about 1.0 kg/hr of the feed rate of the dried pellets 118 to the first furnace 120, such as from about 5 L/min to about 10 L/min, or from about 10 L/min to about 15 L/min for every about 1.0 kg/hr of the feed rate of the dried pellets 118 to the first surface 120. In some embodiments, the flowrate of the inert stream 122 to the first furnace 120 is about 10 L/min for every about 1.0 kg/hr of the dried pellets 118 provided to the first furnace 120. However, the flowrate of the inert stream 122 to the first furnace 120 may be different depending on one or more of the temperature of the first furnace 120, the size of the first furnace 120, or the composition of the feed material 104.

The volatile materials 126 may include volatile hydrocarbons and at least some decomposition products of the dried pellets 118 that are vaporized in the first furnace 120. By way of non-limiting example, the volatile materials 126 may include volatile organic compounds (VOCs), carbon dioxide, methane, formic acid, or other organic materials exhibiting a relatively low vapor pressure.

In some embodiments, the volatile materials 126 are provided to a combustor 128 where the volatile materials 126 are mixed with air 130 or another oxidizer to form combustion products 132. The combustion products 132 may include, for example, carbon dioxide and water.

With continued reference to FIG. 1, responsive to exposure to the temperature in the first furnace 120, the dried pellets 118 may be carbonized to form the carbon sorbent pellets 124. For example, responsive to exposure to heat in the first furnace 120, the 5-hydroxymethylfurfural and levulinic acid polymerize of the dried pellets 118 carbonize to form a char. The carbon sorbent pellets 124 may include mesoporous carbon including pores within a range of from about 2 nm about 50 nm. A composition of the carbon sorbent pellets 124 may depend, at least in part, on the composition of the feed material 104, such as the nitrogen-containing material and/or the processing aid. The carbonization of the dried pellets 118 may decompose components of the dried pellets 118 to form the carbon sorbent pellets 124. In some embodiments, the carbon compounds in the dried pellets 118 and the nitrogen-containing material may decompose in the first furnace 120 and form a high purity carbon including nitrogen atoms (from the nitrogen-containing material) covalently bonded to the carbon. In some embodiments, the carbon includes a carbon ring structure.

A specific surface area of the carbon sorbent pellets 124 may be determined by using Brunauer-Emmett-Teller (BET) surface area analysis. The BET surface area of the carbon sorbent pellets 124 may be within a range of from about 200 $m^2/g$ to about 750 $m^2/g$, such as from about 200 $m^2/g$ to about 300 $m^2/g$, from about 300 $m^2/g$ to about 400 $m^2/g$, from about 400 $m^2/g$ to about 500 $m^2/g$, from about 500 $m^2/g$ to about 600 $m^2/g$, or from about 600 $m^2/g$ to about 750 $m^2/g$. In some embodiments, the carbon sorbent pellets 124 exhibit a BET surface area from about 500 $m^2/g$ to about 700 $m^2/g$.

Although the system 100 has been described and illustrated as including the oven 114, in other embodiments, the system 100 may not include the oven 114. In some such embodiments, the green pellets 112 may be provided directly from the extruder 110 to the first furnace 120. In some such embodiments, water from the slurry 108 may be evaporated in the first furnace 120 and removed from the carbon sorbent pellets 124 in the volatile materials 126.

With continued reference to FIG. 1, the carbon sorbent pellets 124 may be provided to a second furnace 134 and exposed to one or more surface activators 138 to increase a surface area of the carbon sorbent pellets 124 and form activated carbon sorbent pellets 136 and additional volatile materials 140. The at least one surface activator 138 may include, for example, one or more of steam, carbon dioxide, oxygen, or combinations thereof. In some embodiments, the carbon sorbent exhibits substantially the same material composition (e.g., substantially the same atomic percent of different elements, same types of covalent bonds, the same ratio of different chemical bonds). The carbon sorbent pellets 124 and the activated carbon sorbent pellets 136 may collectively be referred to herein as "carbon sorbent."

The additional volatile materials 140 may include one or more materials that volatilize from the carbon sorbent pellets 124 responsive to exposure to the temperature of the second furnace 134. The additional volatile materials 140 may include one or more of the materials described above with reference to the volatile materials 126.

The additional volatile materials 140 may be provided to a second combustor 142, where the additional volatile materials 140 are exposed to air 144 to form additional combustion products 146. The additional combustion products 146 may include one or more of the materials described above with reference to the combustion products 132. The combustion products 132 and the additional combustion products 146 may be mixed to form an exhaust material 148.

The second furnace 134 may be substantially the same as the first furnace 120. In some embodiments, the second furnace 134 includes the same type of furnace as the first furnace 120. Although the system 100 has been described and illustrated as including a separate first furnace 120 and second furnace 134, in some embodiments, the system 100 includes a single furnace. For example, in some embodiments, the carbon sorbent pellets 124 may be collected from the first furnace 120 and stored. The stored carbon sorbent pellets 124 may thereafter be provided to the first furnace 120 at a higher temperature and exposed to the at least one surface activator 138 to form the activated carbon sorbent pellets 136.

With continued reference to FIG. 1, a temperature of the second furnace 134 for activating the carbon sorbent pellets 124 and forming the activated carbon sorbent pellets 136 may be within a range of from about 800° C. to about 1,200° C., such as from about 800° C. to about 900° C., from about 900° C. to about 1,000° C., from about 1,000° C. to about 1,100° C., or from about 1,100° C. to about 1,200° C. In some embodiments, the temperature of the surface activation is within a range of from about 900° C. to about 1,000° C., such as about 950° C. or about 960° C. In some embodiments, the surface activation may be performed at a temperature greater than about 800° C.

The activated carbon sorbent pellets 136 may exhibit a BET surface area greater than the BET surface area of the carbon sorbent pellets 124. For example, the BET surface area of the activated carbon sorbent pellets 136 may be within a range of from about 500 $m^2/g$ to about 2,000 $m^2/g$, such as from about 750 $m^2/g$ to about 1,000 $m^2/g$, from about 1,000 $m^2/g$ to about 1,250 $m^2/g$, from about 1,250 $m^2/g$ to about 1,500 $m^2/g$, from about 1,500 $m^2/g$ to about 1,750 $m^2/g$, or from about 1,750 $m^2/g$ to about 2,000 $m^2/g$. In some embodiments, the BET surface area of the activated carbon sorbent pellets 136 is within a range of from about 500 $m^2/g$ to about 750 $m^2/g$. In some embodiments, the BET surface area of the activated carbon sorbent pellets 136 is from about 500 $m^2/g$ to about 700 $m^2/g$. While the system 100 has been described and illustrated as including the second furnace 134 for forming the activated carbon sorbent pellets 136, in some embodiments, the carbon sorbent pellets 124 may not be activated with the at least one surface activator 138.

A yield of the carbon sorbent may be within a range of from about 10% to about 20%, such as from about 10% to about 15%, or from about 15% to about 20%. In other words, for every about 100 kg of the feed material 104, the system 100 may be configured to generate from about 10 kg to about 20 kg of the activated carbon sorbent pellets 136 or the carbon sorbent pellets 124. However, the disclosure is not so limited, and the yield of the carbon sorbent may be different than that described.

As described above, the carbon sorbent (e.g., the carbon sorbent pellets 124 and/or the activated carbon sorbent pellets 136) may exhibit one or more properties beneficial for $CO_2$ capture. The properties of the carbon sorbent may be affected by the composition of the carbon sorbent, such as the composition of the carbon sorbent at the surface thereof, and the types of chemical bonds at the surface. In some embodiments, the carbon sorbent exhibits a substantially uniform composition, such that the composition of the carbon sorbent at the surface is substantially the same as the composition of the carbon sorbent throughout the carbon sorbent.

Figure 2A:
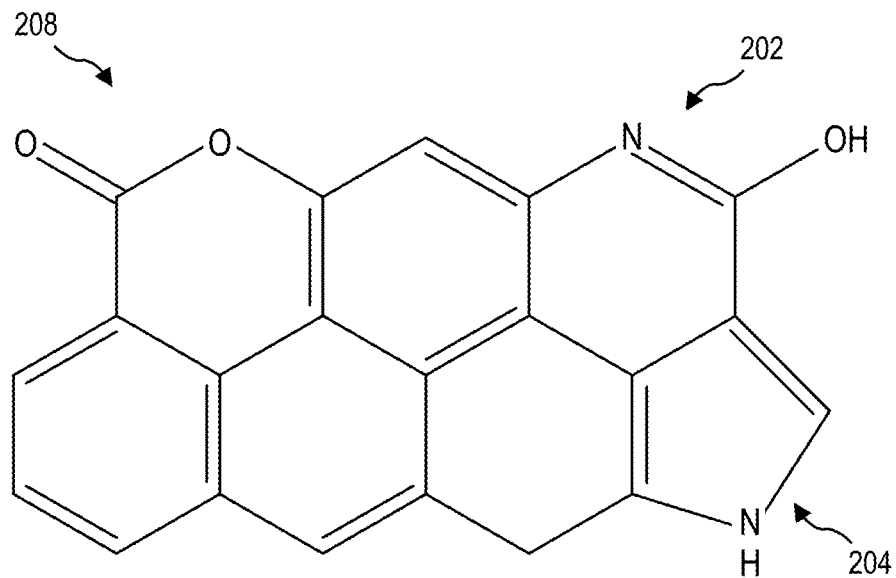
FIG. 2A and FIG. 2B are simplified schematic illustrations of the structure of the activated carbon sorbent pellets, according to at least one embodiment of the disclosure.
Figure 2B:
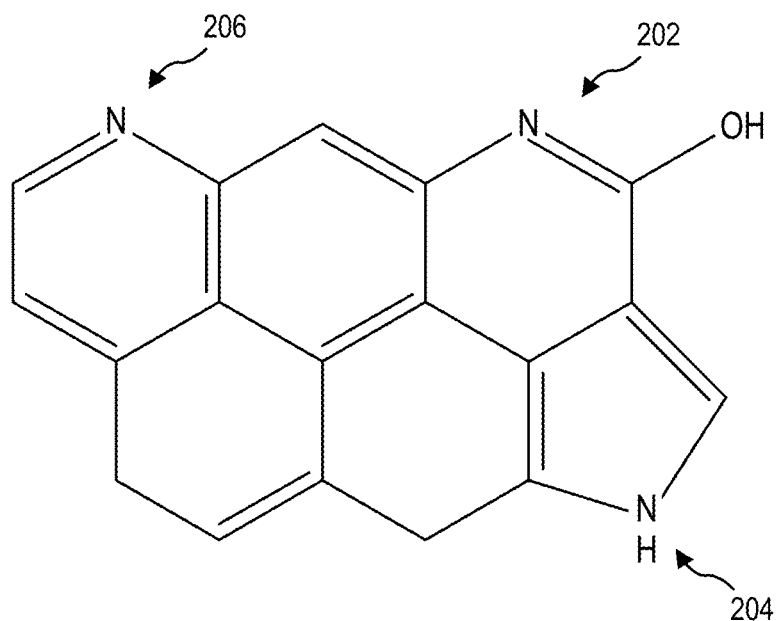

In some embodiments, the carbon sorbent includes carbon atoms, hydrogen atoms, nitrogen atoms, and oxygen atoms. In some embodiments, the carbon sorbent is substantially free of sulfur and phosphorous. FIG. 2A and FIG. 2B are simplified schematic illustrations of the structure of the carbon sorbent (e.g., the carbon sorbent pellets 124 and/or the activated carbon sorbent pellets 136), in accordance with at least one embodiment of the disclosure. Surfaces of the carbon sorbent may include the structures shown in FIG. 2A and FIG. 2B. The surface of the carbon sorbent may include carbon covalently bonded to other carbon atoms, hydrogen atoms, nitrogen atoms, and/or oxygen atoms. In addition, the surface of the carbon sorbent may include nitrogen atoms covalently bonded to carbon atoms, oxygen atoms, or both. In some embodiments, the surfaces of the carbon sorbent include one or more of (e.g., each of) carbon to carbon single bonds (C—C bonds), carbon to hydrogen single bonds (C—H bonds), carbon to oxygen single bonds (C—O bonds), carbon to nitrogen single bonds (C—N bonds), carbon to oxygen double bonds (C═O bonds) wherein the carbon atom is also single bonded to another oxygen or a nitrogen atoms (e.g., O—C—O bonds and/or N—C═O bonds), pyridine groups, pyridine groups, pyrrole groups, pyrone groups, lactone groups, or combinations thereof. For example, with combined reference to FIG. 2A and FIG. 2B, the surfaces of the carbon sorbent may include pyridone groups or pyridone like structures 202, pyrrole groups 204, pyridine groups 206, and pyrone groups 208. In some embodiments, the carbon sorbent includes each of pyridone groups or pyridone like structures, pyrrole groups, pyridine groups, pyrone groups, and lactone groups. In some embodiments, at least some of the carbon atoms at the surface of the carbon sorbent are conjugated and include of π-π* bonds.

As used herein, and unless specified otherwise, the carbon content, the oxygen content, the nitrogen content, the sulfur content, and the phosphorous content (e.g., the atomic percent of carbon, oxygen, nitrogen, sulfur, and phosphorous) at the surface of the carbon sorbent is exclusive of (e.g., does not consider) hydrogen at the surface of the carbon sorbent. In other words, unless specified otherwise, the atomic percent of each of the components of the carbon sorbent at the surface of the carbon sorbent (e.g., carbon, oxygen, nitrogen, sulfur, and phosphorus) is exclusive of hydrogen and does not consider hydrogen present at the surface of the carbon sorbent. In some such embodiments, the atomic percents of the components of the carbon sorbent at the surface thereof are normalized with respect to each other such that the atomic percent of the components exclusive of hydrogen add to 100 atomic percent (even though the surface of the carbon sorbent may include hydrogen). Thus, for example, a carbon content (e.g., an atomic percent of carbon) at the surface of the carbon sorbent exclusive of hydrogen means and includes the carbon content (e.g., the atomic percent of carbon) at the surface of the carbon sorbent when the atomic percent is calculated without consideration of the hydrogen at the surface of the carbon sorbent. Similarly, a nitrogen content, an oxygen content, a sulfur content, and a phosphorous content at the surface of the carbon sorbent exclusive of hydrogen means and includes the content (e.g., atomic percent) of the respective nitrogen, oxygen, sulfur, and phosphorous at the surface of the carbon sorbent when content is calculated without consideration of the hydrogen at the surface of the carbon sorbent.

A carbon content at the surface of the carbon sorbent, exclusive of hydrogen (not including hydrogen) may be within a range of from about 90.0 atomic percent to about 95.0 atomic percent, such as from about 90.0 atomic percent to about 91.0 atomic percent, from about 91.0 atomic percent to about 92.0 atomic percent, from about 92.0 atomic percent to about 93.0 atomic percent, from about 93.0 atomic percent to about 94.0 atomic percent, from about 94.0 atomic percent to about 95.0 atomic percent, or from about 95.0 atomic percent to about 96.0 atomic percent. In some embodiments, the carbon sorbent includes from about 93.0 atomic percent to about 94.0 atomic percent carbon at the surface, such as about 93.4 atomic percent carbon at the surface. However, the disclosure is not so limited, and the carbon content at the surface of the carbon sorbent may be different than that described.

An oxygen content of the carbon sorbent at the surface of the carbon sorbent, exclusive of hydrogen (not including hydrogen), may be within a range of from about 3.0 atomic percent to about 7.0 atomic percent, such as from about 3.0 atomic percent to about 4.0 atomic percent, from about 4.0 atomic percent to about 5.0 atomic percent, from about 5.0 atomic percent to about 6.0 atomic percent, or from about 6.0 atomic percent to about 7.0 atomic percent. In some embodiments, the oxygen content of the carbon sorbent is within a range of from about 5.0 atomic percent to about 6.0 atomic percent, such as about 5.3 atomic percent. However, the disclosure is not so limited, and the oxygen content of the carbon sorbent may be different than that described.

A nitrogen content of at the surface of the carbon sorbent, exclusive of hydrogen (not including hydrogen) may be within a range of from about 1.5 atomic percent to about 4.5 atomic percent, such as from about 1.5 atomic percent to about 2.5 atomic percent, from about 2.5 atomic percent to about 3.5 atomic percent, or from about 3.5 atomic percent to about 4.5 atomic percent. In some embodiments, a nitrogen content at the surface of the carbon sorbent is within a range of from about 1.5 atomic percent to about 2.5 atomic percent, such as about 2.2 atomic percent. However, the disclosure is not so limited, and the nitrogen content at the surface of the carbon sorbent may be different than that described.

An atomic ratio of oxygen to nitrogen at the surface of the carbon sorbent may be within a range of from about 2.0:1.0 to about 3.0:1.0, such as from about 2.0:1.0 to about 2.25:1.0, from about 2.25:1.0 to about 2.5:1.0, from about 2.5:1.0 to about 2.75:1.0, or from about 2.75:1.0 to about 3.0:1.0. In some embodiments, the atomic ratio of oxygen to nitrogen at the surface of the carbon sorbent is within the range of from about 2.25:1.0 to about 2.5:1.0, such as about 2.4:1.0. However, the disclosure is not so limited, and the atomic ratio of oxygen to nitrogen at the surface of the carbon sorbent may be different than that described.

A ratio of the combination of pyridone groups and pyrrole groups to pyridine groups (e.g., the ratio of pyridone/pyrrole to pyridine) at the surface of the carbon sorbent may be within a range of from about 2.5:1.0 to about 4.0:1.0, such as from about 2.5:1.0 to about 3.0:1.0, from about 3.0:1.0 to about 3.5:1.0, or from about 3.5:1.0 to about 4.0:1.0. In other words, for every about 1.0 part pyridine, the surface of the carbon sorbent may include from about 2.5 parts to about 4.0 parts of one or both of pyridone and pyrrole. In some embodiments, the ratio of pyridone and pyrrole to pyridine is about 3.0:1.0, such as about 2.9:1.0. The ratio of pyridone and pyrrole to pyridine may be greater than about 2.0:1.0. In some embodiments, from about 70.0 atomic percent to about 80.0 atomic percent, such as from about 73.0 atomic percent to about 75.0 atomic percent of the nitrogen atoms at the surface of the carbon sorbent, are part of pyridone and/or pyrrole structures; and from about 20.0 atomic percent to about 30.0 atomic percent, such as from about 25.0 atomic percent to about 27.0 atomic percent of the nitrogen atoms at the surface of the carbon sorbent, are part of pyridine structures. In some embodiments, at least some of the nitrogen atoms at the surface of the carbon sorbent includes pyridine and at least 70.0 atomic percent of the nitrogen atoms at the surface of the carbon sorbent include at least one of pyridone or pyrrole. In some embodiments, greater than about 20.0 atomic percent of the nitrogen atoms at the surface of the carbon sorbent include pyridine. In some embodiments, greater than about 25.0 atomic percent of the nitrogen atoms at the surface of the carbon sorbent are part of pyridine groups; and less than about 75.0 atomic percent of the nitrogen atoms at the surface of the carbon sorbent are part of pyridone groups and/or pyrrole groups.

An atomic percent of the carbon atoms on the surface of the carbon sorbent that are part of carbon to carbon single bonds and/or carbon to hydrogen bonds may be within a range of from about 60.0 percent to about 75.0 atomic percent, such as from about 60.0 atomic percent to about 65.0 atomic percent, from about 65.0 atomic percent to about 70.0 atomic percent, or from about 70.0 atomic percent to about 75.0 atomic percent. In some embodiments, between about 60.0 atomic percent to about 65.0 atomic percent of the carbon atoms on the surface of the carbon sorbent are part of carbon to carbon single bonds and carbon to hydrogen bonds.

In some embodiments, an atomic percent of the carbon atoms on the surface of the carbon sorbent that are single bonded to oxygen (C—O bonds) or single bonded to nitrogen (C—N bonds) may be within a range of from about 11.0 atomic percent to about 15.0 atomic percent, such as from about 11.0 atomic percent to about 12.0 atomic percent, from about 12.0 atomic percent to about 13.0 atomic percent, from about 13.0 atomic percent to about 14.0 atomic percent, or from about 14.0 atomic percent to about 15.0 atomic percent. In some embodiments, between about 12.0 atomic to about 13.0 atomic percent of the carbon atoms on the surface of the carbon sorbent are part of carbon to oxygen single bonds and carbon to nitrogen bonds.

An atomic percent of the carbon atoms on the surface of the carbon sorbent that form a carbon to oxygen double bond (C═O bonds) or that are single bonded to each of an oxygen atom and a nitrogen atom (N—C—O) may be within a range of from about 5.0 atomic percent to about 9.0 atomic percent, such as from about 5.0 atomic percent to about 6.0 atomic percent, from about 6.0 atomic percent to about 7.0 atomic percent, from about 7.0 atomic percent to about 8.0 atomic percent, or from about 8.0 atomic percent to about 9.0 atomic percent. In some embodiments, from about 7.0 atomic percent to about 8.0 atomic percent, such as about 7.6 atomic percent of the carbon atoms on the surface of the carbon sorbent are either double bonded to an oxygen atom and/or single bonded to each of a nitrogen atom and an oxygen atom. In some embodiments, greater than about 7.0 atomic percent of the carbon atoms at the surface of the carbon sorbent are either double bonded to an oxygen atom or single bonded to an oxygen atom and single bonded to a nitrogen atom (e.g., either C═O, or N—C—O).

An atomic percent of the carbon atoms on the surface of the carbon sorbent that are single bonded to an oxygen atom and double bonded to an oxygen atom (O—C—O) or that are single bonded to a nitrogen atom and double bonded to an oxygen atom (N—C═O) may be within a range of from about 2.0 atomic percent to about 4.0 atomic percent, such as from about 2.0 atomic percent to about 2.5 atomic percent, from about 2.5 atomic percent to about 3.0 atomic percent, from about 3.0 atomic percent to about 3.5 atomic percent, or from about 3.5 atomic percent to about 4.0 atomic percent. In some embodiments, from about 3.0 atomic percent to about 3.5 atomic percent, such as about 3.1 atomic percent of the carbon atoms on the surface of the carbon sorbent are double bonded to an oxygen atom and single bonded to either of another oxygen atom or a nitrogen atom. In some embodiments, greater than about 2.5 atomic percent, such as greater than about 3.0 atomic percent of the carbon atoms on the surface of the carbon sorbent are double bonded to an oxygen atom and single bonded to one of another oxygen atom or a nitrogen atom.

An atomic percent of the carbon atoms on the surface of the carbon sorbent that exhibit $\pi$-$\pi$* conjugation may be within a range of from about 10.0 atomic percent to about 16.0 atomic percent, such as from about 10.0 atomic percent to about 12.0 atomic percent, from about 12.0 atomic percent to about 13.0 atomic percent, from about 13.0 atomic percent to about 14.0 atomic percent, from about 14.0 atomic percent to about 15.0 atomic percent, or from about 15.0 atomic percent to about 16.0 atomic percent. In some embodiments, an atomic percent of the carbon atoms on the surface of the carbon sorbent that exhibit $\pi$-$\pi$* conjugation may be greater than about 13.0 atomic percent, such as greater than about 14.0 atomic percent. In some embodiments, an atomic percent of the carbon atoms on the surface of the carbon sorbent that exhibit $\pi$-$\pi$* conjugation may be within a range of from about 14.0 atomic percent to about 14.5 atomic percent, such as about 14.2 atomic percent.

In some embodiments, the surface of the carbon sorbent may include a greater atomic percent of carbon to oxygen single bonds than of carbon to oxygen double bonds. An atomic percent of the carbon to oxygen bonds that are carbon to oxygen single bonds (C—O) may be within a range of from about 40.0 atomic percent to about 70.0 atomic percent, such as from about 40.0 atomic percent to about 50.0 atomic percent, from about 50.0 atomic percent to about 60.0 atomic percent, or from about 60.0 atomic percent to about 70.0 atomic percent. In some embodiments, from about 50.0 atomic percent to about 60.0 atomic percent of the carbon to oxygen bonds on the surface of the carbon sorbent are carbon to oxygen single bonds. In some embodiments, from about 30.0 atomic percent to about 60.0 atomic percent of the carbon to oxygen bonds on the surface of the carbon sorbent are carbon to oxygen double bonds, such as from about 30.0 atomic percent to about 40.0 atomic percent, from about 40.0 atomic percent to about 50.0 atomic percent, or from about 50.0 atomic percent to about 60.0 atomic percent. In some embodiments, greater than 40.0 atomic percent of the oxygen atoms at the surface of the carbon sorbent are double bonded to a carbon atom. In some embodiments, from about 40.0 atomic percent to about 50.0 atomic percent, such as about 44.0 atomic percent of the carbon to oxygen bonds on the surface of the carbon sorbent are carbon to oxygen double bonds.

A Barrett-Joyner-Halenda (BJH) pore volume of the carbon sorbent may be within a range of from about 0.040 $cm^3/g$ to about 0.060 $cm^3/g$, such as from about 0.040 $cm^3/g$ to about 0.045 $cm^3/g$, from about 0.045 $cm^3/g$ to about 0.050 $cm^3/g$, from about 0.050 $cm^3/g$ to about 0.055 $cm^3/g$, or from about 0.055 cm³/g to about 0.060 cm³/g. In some embodiments, the BJH pore volume of the carbon sorbent is within a range of from about 0.050 cm³/g to about 0.060 cm³/g, such as about 0.056 cm³/g. In some embodiments, the BJH pore volume is greater than about 0.050 cm³/g and less than about 0.060 cm³/g. However, the disclosure is not so limited, and the BJH pore volume of the carbon sorbent may be different than those described.

A BJH average pore width of the carbon sorbent may be within a range of from about 3.0 nm to about 4.0 nm, such as from about 3.0 nm to about 3.2 nm, from about 3.2 nm to about 3.4 nm, from about 3.4 nm to about 3.6 nm, from about 3.6 nm to about 3.8 nm, or from about 3.8 nm to about 4.0 nm. In some embodiments, the average BJH average pore width of the carbon sorbent is within a range of from about 3.2 nm to about 3.4 nm, such as about 3.3 nm. In other embodiments, the average BJH average pore width of the carbon sorbent is within a range of from about 3.6 nm to about 3.8 nm, such as about 3.7 nm. However, the disclosure is not so limited, and the BJH average pore width of the carbon sorbent may be different than those described.

A T-plot micropore volume determined by BJT analysis of the carbon sorbent may be within a range of from about 0.200 cm³/g to about 0.400 cm³/g, such as from about 0.200 cm³/g to about 0.250 cm³/g, from about 0.0250 cm³/g to about 0.300 cm³/g, from about 0.300 cm³/g to about 0.350 cm³/g, or from about 0.350 cm³/g to about 0.400 cm³/g. In some embodiments, the micropore volume of the carbon sorbent is within a range of from about 0.275 cm³/g to about 0.300 cm³/g.

A bulk density of the carbon sorbent may be within a range of from about 0.35 g/cm³ to about 0.60 g/cm³, such as from about 0.35 g/cm³ to about 0.40 g/cm³, from about 0.40 g/cm³ to about 0.45 g/cm³, from about 0.45 g/cm³ to about 0.50 g/cm³, from about 0.50 g/cm³ to about 0.55 g/cm³, or from about 0.55 g/cm³ to about 0.60 g/cm³. In some embodiments, the bulk density of the carbon sorbent is within a range of from about 0.38 g/cm³ to about 0.50 g/cm³, such as from about 0.45 g/cm³ to about 0.48 g/cm³. The bulk density of the carbon sorbent may be greater than about 0.40 g/cm³, such as greater than about 0.45 g/cm³, or greater than about 0.50 g/cm³.

Accordingly, in some embodiments, the surface of the carbon sorbent includes greater than about 2.0 atomic percent nitrogen, greater than about 4.0 atomic percent oxygen (e.g., greater than about 5.0 atomic percent oxygen), and greater than about 90.0 atomic percent carbon (e.g., greater than about 93.0 atomic percent carbon), the atomic percents exclusive of hydrogen. In addition, a greater atomic percent of nitrogen at the surface of the carbon sorbent may be part of pyridone and/or pyrrole than of pyridine. For example, greater than about at least 70.0 atomic percent of the nitrogen atoms at the surface may be part of pyridone and/or pyrrole groups and less than about 30.0 atomic percent of the nitrogen atoms at the surface may be part of pyridine groups. In addition, in some such embodiments, greater than about 7.0 atomic percent of the carbon atoms at the surface of the carbon sorbent are either double bonded to an oxygen atom or single bonded to an oxygen atom and single bonded to a nitrogen atom (e.g., either C—O, or N—C—O) and greater than about 2.5 atomic percent (e.g., greater than about 3.0 atomic percent) of the carbon atoms at the surface of the carbon sorbent are double bonded to an oxygen atom and single bonded to one of another oxygen atom or a nitrogen atom. Further, in some such embodiments, greater than about 10.0 atomic percent of the carbon atoms at the surface of the carbon sorbent exhibit π-π* conjugation. The density of such carbon sorbents is greater than about 0.40 g/cm³, such as greater than about 0.45 g/cm³, or greater than a about 0.50 g/cm³.

A carbon dioxide loading capacity (also referred to as a "carbon dioxide capacity") of the carbon sorbent pellets (the carbon sorbent pellets 124 and/or the activated carbon sorbent pellets 136) may be measured by exposing the carbon sorbent pellets to a gas stream at different temperatures and partial pressures of carbon dioxide.

The $CO_2$ capacity of the carbon sorbent pellets at a $CO_2$ partial pressure (a partial pressure of $CO_2$) of about 760 mmHg at 60° C. may be within a range of from about 5.00 weight percent to about 8.00 weight percent. The weight of the $CO_2$ adsorbed by the carbon sorbent pellets may correspond to from 5.00 weight percent to about 8.00 weight percent of the weight of the carbon sorbent pellets at 60° C. and a $CO_2$ partial pressure of about 760 mmHg. For example, 100 grams of the carbon sorbent pellets may be loaded with from about 5.00 grams to about 8.00 grams of carbon dioxide at 60° C. and a $CO_2$ partial pressure of about 760 mmHg. The range of $CO_2$ capacity for the carbon sorbent pellets at 60° C. and a $CO_2$ partial pressure of about 760 mmHg may be from about 5.00 weight percent to about 8.00 weight percent, such as from about 5.00 weight percent to about 6.00 weight percent, from about 6.00 weight percent to about 7.00 weight percent, or from about 7.00 weight percent to about 8.00 weight percent. In some embodiments, the $CO_2$ capacity of the carbon sorbent pellets at 60° C. and a $CO_2$ partial pressure of about 760 mmHg is within a range of from about 6.00 weight percent to about 8.00 weight percent. The $CO_2$ capacity of the carbon sorbent pellets at 60° C. and a $CO_2$ partial pressure of about 760 mmHg may be greater than about 6.00 weight percent, such as greater than about 6.50 weight percent, or greater than about 7.00 weight percent.

The $CO_2$ capacity of the carbon sorbent pellets at 30° C. and a partial pressure of $CO_2$ of about 760 mmHg may be within a range of from about 9.00 weight percent to about 12.00 weight percent, such as from about 9.00 weight percent to about 10.00 weight percent, from about 10.00 weight percent to about 11.00 weight percent, or from about 11.00 weight percent to about 12.00 weight percent of the carbon sorbent pellets. In some embodiments, the carbon sorbent has a $CO_2$ capacity within a range of from about 10.00 weight percent to about 12.00 weight percent, such as from about 11.00 weight percent to about 12.00 weight percent at 30° C. and a $CO_2$ partial pressure of about 760 mmHg. The $CO_2$ capacity of the carbon sorbent pellets at 30° C. and a $CO_2$ partial pressure of about 760 mmHg may be greater than about 10.00 weight percent, such as greater than about 10.50 weight percent, greater than about 11.00 weight percent, or greater than about 11.50 weight percent of the carbon sorbent pellets.

The $CO_2$ capacity of the carbon sorbent at 60° C. and a $CO_2$ partial pressure of about 114 mmHg be within a range of from about 1.00 weight percent to about 2.50 weight percent, such as from about 1.00 weight percent to about 1.50 weight percent, from about 1.50 weight percent to about 2.00 weight percent, or from about 2.00 weight percent to about 2.50 weight percent of the carbon sorbent pellets. In some embodiments, the $CO_2$ capacity of the carbon sorbent at 60° C. and a $CO_2$ partial pressure of about 114 mmHg is greater than about 1.50 weight percent. The $CO_2$ capacity at 60° C. and a $CO_2$ partial pressure of about 114 mmHg may be measured by exposing the carbon sorbent pellets to a gas including about 15 volume percent $CO_2$ at a total pressure of about 760 mmHg (and a $CO_2$ partial pressure of 114 mmHg).

The $CO_2$ capacity of the carbon sorbent pellets at 30° C. and a $CO_2$ partial pressure of about 114 mmHg may be within a range of from about 2.50 weight percent to about 4.50 weight percent, such as from about 2.50 weight percent to about 3.00 weight percent, from about 3.00 weight percent to about 3.50 weight percent, from about 3.50 weight percent to about 4.00 weight percent, or from about 4.00 weight percent to about 4.50 weight percent of the carbon sorbent pellets. In some embodiments, the $CO_2$ capacity of the carbon sorbent at 30° C. and a $CO_2$ partial pressure of about 114 mmHg is greater than about 3.00 weight percent.

In some embodiments, at 30° C. the carbon sorbent pellets may exhibit at least about 5.00 weight percent more, such as at least about 6.00 weight percent, at least about 6.50 weight percent, at least about 7.00 weight percent, at least about 7.50 weight percent, or even at least about 8.00 weight percent more $CO_2$ capacity at a $CO_2$ partial pressure of 760 mmHg than at a $CO_2$ partial pressure of 114 mmHg. In other words, at 30° C. and a $CO_2$ partial pressure of 760 mmHg, the $CO_2$ capacity of the carbon sorbent pellets may be at least about 5.00 weight percent greater than the $CO_2$ capacity of the carbon sorbent pellets at 30° C. and a $CO_2$ partial pressure of 114 mmHg. In addition, at 60° C. and a $CO_2$ partial pressure of 760 mmHg, the carbon sorbent pellets may exhibit at least about 4.00 weight percent more, such as at least about 4.50 weight percent, at least about 5.00 weight percent, or even at least about 5.50 weight percent more $CO_2$ capacity than at 60° C. and a $CO_2$ partial pressure of 114 mmHg.

The carbon sorbent pellets may exhibit an Ideal Adsorption Solution Theory (IAST) selectivity to carbon dioxide relative to nitrogen ($N_2$) at 60° C. greater than about 10.00, such as greater than about 11.00, greater than about 12.00, greater than about 13.00, or greater than about 14.00. In some embodiments, the selectivity of the carbon sorbent pellets to $CO_2$ relative to $N_2$ at 60° C. may be at least about 11.00, such as at least about 12.00. As used herein the selectivity of the carbon sorbent pellets to $CO_2$ relative to $N_2$ at a particular temperature and includes the ratio of the mole fractions in the adsorbed state (q) of $CO_2$ to $N_2$ at the partial pressure of each of $CO_2$ and $N_2$. For example, the selectivity of the carbon sorbent pellets to $CO_2$ relative to $N_2$ at a particular temperature may be defined according to Equation (1) below:

$$S = \frac{\frac{q_{CO_2}}{P_{CO_2}}}{\frac{q_{N_2}}{P_{N_2}}}; \quad (1)$$

wherein $q_{CO2}$ is the mole fraction of adsorbed $CO_2$ at the particular temperature; $P_{CO2}$ is the partial pressure of $CO_2$ at which the $CO_2$ is adsorbed; $q_{N2}$ is the mole fraction of adsorbed $N_2$ at the particular temperature; and $P_{N2}$ is the partial pressure of $N_2$ at which the $N_2$ is adsorbed. As used herein, the selectivity of the carbon sorbent pellets to $CO_2$ relative to $N_2$ is measured with a gas including 15 volume percent $CO_2$ and 85 volume percent $N_2$ at a total pressure of 760 mmHg such that the gas has a partial pressure of $CO_2$ of about 114 mmHg and a partial pressure of $N_2$ of about 646 mmHg.

The selectivity of the carbon sorbent pellets to $CO_2$ relative to $N_2$ at 30° C. (and a partial pressure of $CO_2$ of about 114 mmHg and a partial pressure of $N_2$ of about 646 mmHg) may be within a range of from about 12.00 to about 16.00, such as from about 12.00 to about 13.00, from about 13.00 to about 14.00, from about 14.00 to about 15.00, or from about 15.00 to about 16.00. In some embodiments, the selectivity of the carbon sorbent pellets to $CO_2$ relative to $N_2$ at 30° C. is greater than about 12.00, such as greater than about 13.00, or greater than about 14.00.

At about 0° C. and a relative humidity of about 25 percent, the carbon sorbent pellets may exhibit a water uptake within a range of from about 1.50 weight percent to about 2.50 weight percent of the carbon sorbent pellets, such as from about 1.50 weight percent to about 2.00 weight percent, or from about 2.00 weight percent to about 2.50 weight percent of the carbon sorbent pellets. In some embodiments, the water uptake of the carbon sorbent pellets at about 0° C. and a relative humidity of about 50 percent is less than about 2.00 weight percent.

At about 0° C. and a relative humidity of about 50 percent, the carbon sorbent pellets may exhibit a water uptake within a range of from about 18.00 weight percent to about 22.00 weight percent of the carbon sorbent pellets, such as from about 18.00 weight percent to about 20.00 weight percent, or from about 20.00 weight percent to about 22.00 weight percent of the carbon sorbent pellets. In some embodiments, the water uptake of the carbon sorbent at about 0° C. and a relative humidity of about 50 percent is less than about 21.00 weight percent, such as less than about 20.00 weight percent, or less than about 19.00 weight percent. At about 25° C. and a relative humidity of about 50 percent, the carbon sorbent may exhibit a water uptake within a range of from about 18.00 weight percent to about 21.00 weight percent, such as from about 18.00 weight percent to about 19.00 weight percent, from about 19.00 weight percent to about 20.00 weight percent, or from about 20.00 weight percent to about 21.00 weight percent of the carbon sorbent pellets. In some embodiments, the water uptake of the carbon sorbent at about 0° C. and a relative humidity of about 50 percent is less than about 21.00 weight percent, such as less than about 20.00 weight percent, or less than about 19.00 weight percent of the carbon sorbent pellets. In some embodiments, the water uptake of the carbon sorbent at about 25° C. and a relative humidity of about 50 percent is less than about 21.00 weight percent.

The carbon sorbent pellets may exhibit less water uptake compared to conventional carbon sorbent materials. In some embodiments, the water uptake of the carbon sorbent pellets may be within a range of from about 12.0 mol water/kg of carbon sorbent to about 14.0 mol water/kg carbon sorbent at a relative humidity of about 100 percent and a temperature within a range of from about 0° C. to about 25° C. For example, at about 25° C. and a relative humidity of about 100 percent, the carbon sorbent pellets may exhibit a water uptake less than about 14.0 mol water/kg carbon sorbent. At a relative humidity of about 50 percent and a temperature of about 25° C., the carbon sorbent pellets may exhibit a water update of less than about 12.0 mol water/kg carbon sorbent pellet.

An isostatic heat of adsorption of carbon dioxide of the carbon sorbent may be within a range of from about 25.0 KJ/mol to about 30.0 KJ/mol, such as from about 25.0 KJ/mol to about 27.5 KJ/mol, or from about 27.5 KJ/mol to about 30.0 KJ/mol. An isostatic heat of adsorption of water of the carbon sorbent may be within a range of from about 43.00 kJ/mol to about 47.00 KJ/mol, such as from 43.00

KJ/mol to about 45.00 KJ/mol, or from about 45.00 KJ/mol to about 47.00 KJ/mol. An isostatic heat of adsorption of oxygen of the carbon sorbent may be within a range of from about 14.00 KJ/mol to about 15.00 KJ/mol, and the isostatic heat of adsorption of nitrogen of the carbon sorbent may be within a range of from about 17.00 KJ/mol to about 19.00 kJ/mol, such as from about 17.00 KJ/mol to about 18.00 KJ/mol, or from about 18.00 KJ/mol to about 19.00 KJ/mol.

The carbon sorbent pellets (e.g., the carbon sorbent pellets 124 and/or the activated carbon sorbent pellets 136) may be used in carbon capture systems to capture $CO_2$ from, such as from flue gases at point sources (e.g., power plants, refineries, cement plants, steel plants). For example, the carbon sorbent pellets may be used in pressure swing adsorption (PSA) systems and/or vacuum swing adsorption (VSA) systems. In some embodiments, the carbon sorbent pellets are used in a multi-bed, solid-state sorbent contactor.

Figure 3:
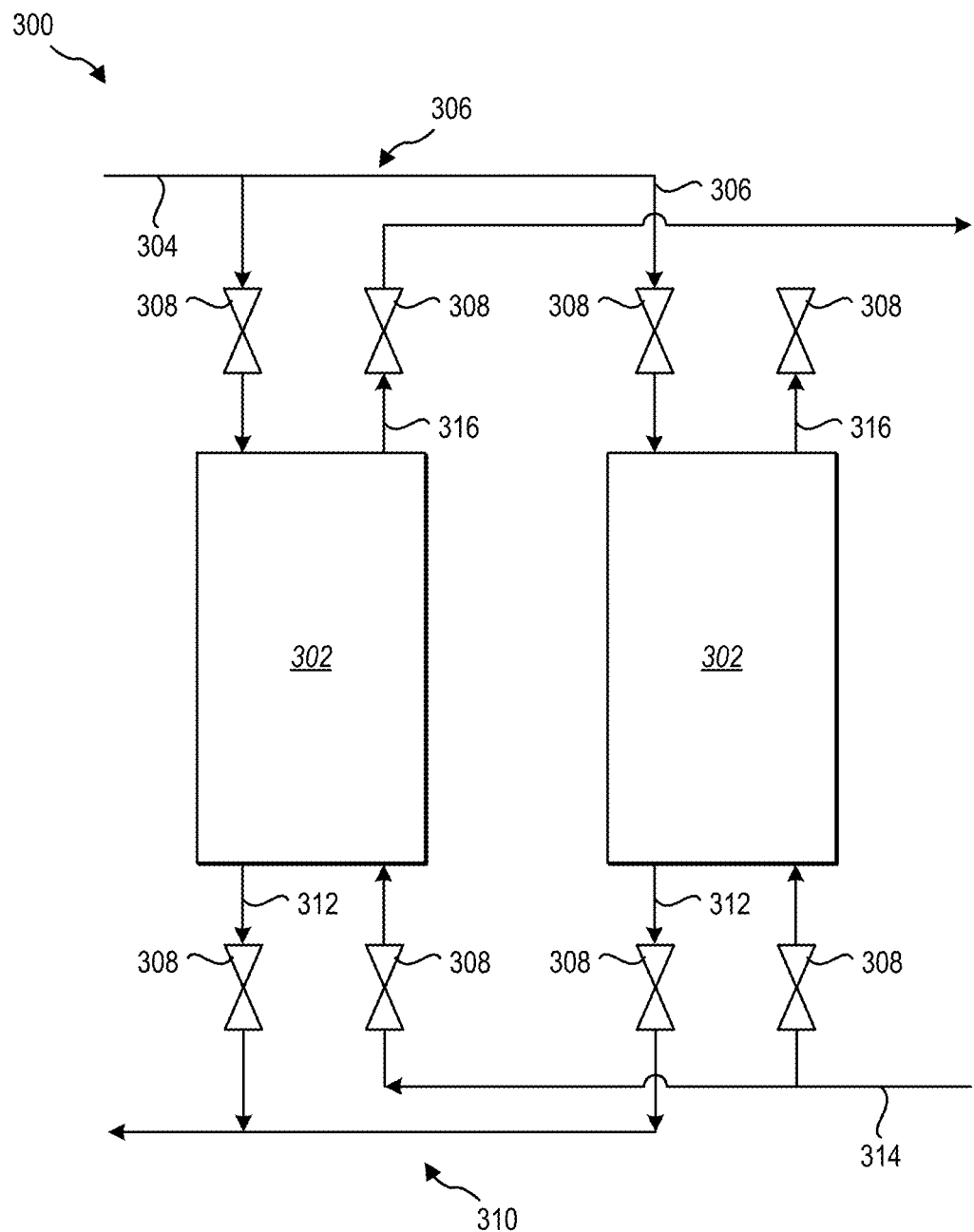
FIG. 3 is a simplified schematic illustrating a system for physically adsorbing carbon dioxide, according to at least one embodiment of the disclosure.

FIG. 3 is a simplified schematic illustrating a system 300 for physically adsorbing carbon dioxide using sorbent beds 302, according to at least one embodiment of the disclosure. Each sorbent bed 302 includes (e.g., is filled, is at least partially filled) a volume of carbon sorbent (e.g., the carbon sorbent pellets 124 and/or the activated carbon sorbent pellets 136). The system 300 may be configured to facilitate recovery of $CO_2$ from an inlet stream 304 (also referred to as a "feed stream") including a concentration of $CO_2$. The inlet stream 304 may be provided to an inlet manifold 306, which may include piping and valves 308 configured to selectively provide the inlet stream 304 through one or more desired sorbent beds 302. While FIG. 3 illustrates two sorbent beds 302, the system 300 may include a greater number (e.g., three, four, five, six, etc.) of sorbent beds 302.

With continued reference to FIG. 3, an outlet manifold 310 may include outlets 312 from each of the sorbent beds 302. Each of the outlets 312 may include valves 308 configured to facilitate control of flows out of each of the respective sorbent bends 302. The outlets 312 may include a purified stream including less $CO_2$ than the inlet stream 304 (since the $CO_2$ may be captured by physical adsorption on the carbon sorbent pellets of the sorbent beds 302). In use and operation, the inlet stream 304 may be directed to one or more of the sorbent beds 302 via the valves 308 in fluid communication with the inlet manifold 306. In some embodiments, at least one of the sorbent beds 302 may not be in fluid communication with the inlet manifold 306 (e.g., the valve 308 to the inlet of the sorbent bed 302 may be closed) while at least another of the sorbent beds 302 is in fluid communication with the inlet stream 304. As described in further detail herein, in some such embodiments, the carbon sorbent in the one or more sorbent beds 302 not in fluid communication with the inlet stream 304 may be exposed to a regeneration process while the at least another of the sorbent beds 302 is capturing $CO_2$ from the inlet stream 304.

Each of the sorbent beds 302 may further be configured to be in fluid communication with a regeneration stream 314 through one or more valves 308. The regeneration stream 314 may be configured to flow through the sorbent beds 302 to regenerate the carbon sorbent within the sorbent beds and form a desorption outlet stream 316, which may, for example, be discharged to the atmosphere and/or be condensed and recycled for further recovery. For example, responsive to exposure to the regeneration stream 314, adsorbed $CO_2$ may be desorbed from the carbon sorbent to form the desorption outlet stream 316. The regeneration stream 314 may include, for example, one or more of steam, nitrogen, another material, or combinations thereof. The carbon sorbent in the sorbent beds 302 may be regenerated by exposing the carbon sorbent to one or more of a pressure swing, a concentration swing, a thermal swing, or combinations thereof.

The sorbent beds 302 may each include for example, a fixed bed adsorption bed, such as radial-type bed. The sorbent beds 302 may be operated in either a centripetal manner (wherein the adsorption flow is radially inward) or a centrifugal manner (wherein the adsorption flow is radially outward). The sorbent beds 302 may be configured to support flow of one or more streams in a co-current direction and/or a counter-current direction. In some embodiments, the adsorption and desorption cycle includes adsorption, co-current blow-down, counter-current $CO_2$ recovery/regeneration, and pressurization.

While FIG. 3 has described and illustrated a system 300 including a particular configuration, the disclosure is not so limited, and the carbon sorbent may be used in other systems including different adsorption beds.

The carbon sorbent may be advantageous for $CO_2$ recovery. For example, the carbon sorbent pellets according to embodiments of the disclosure may exhibit improved $CO_2$ adsorption capacity, improved selectivity to $CO_2$ relative to water and nitrogen, and reduced water adsorption compared to other carbon sorbents. The particular composition and the types of covalent bonds at the surface of the carbon sorbent pellets described herein facilitate the improved $CO_2$ capture properties (e.g., $CO_2$ capacity, selectivity to $CO_2$) of the carbon sorbent pellets. In addition, the carbon sorbent may be regenerated at lower cost (e.g., with less energy) compared to conventional carbon sorbent materials, reducing the cycle time, and increasing the utilization of the carbon sorbent. Further, the isostatic heat of adsorption of the carbon sorbent is less than the isostatic heat of absorption of amine sorbents and alkali sorbents that form stronger bonds with $CO_2$ compared to the physical adsorption that takes place with the carbon sorbent pellets. Thus, the carbon sorbent pellets can be regenerated with less energy compared to the liquid amine sorbents and alkali sorbents.

EXAMPLES

Example 1

Carbon sorbents having different material properties and chemical compositions were prepared from various feed materials. The feed materials of different carbon sorbent formulations are listed in Table 1 below.

TABLE 1

| Carbon Sorbent Formulation | Sugar (wt. %) | Nitrogen Compound | Nitrogen Compound (wt. %) | Cornstarch (wt. %) | Processing Aid (wt. %) |
|---|---|---|---|---|---|
| 1 | 37.9 | Glycine | 2.4 | 56.8 | 2.8 |
| 2 | 37.9 | Glycine | 2.4 | 56.8 | 2.8 |
| 3 | 38.1 | Melamine | 4.8 | 57.1 | 0 |
| 4 | 38.1 | Melamine | 4.8 | 57.1 | 0 |
| 8 | 34.8 | Guanidine | 13.0 | 52.2 | 0 |
| 9 | 39.0 | Glycine | 2.5 | 58.5 | 0 |

Various properties of pellets of carbon sorbent formulations 1, 2, 3, 4, 8, and 9 (also referred to as "carbon sorbent 1," "carbon sorbent 2," etc.) having a diameter of about 0.79 mm (about 0.0313 inch) were measured, as shown in Table 2 below. The measured properties included the BET surface area, the BJH pore volume, the T-plot micropore volume, the BJH average pore width, the bulk density, and the tap density of the pellets.

TABLE 2

| Carbon Sorbent Formulation | BET Surface Area (m²/g) | BJH Pore Volume (cm³/g) | T-plot micropore volume (cm³/g) | BJH Average Pore Width (nm) | Bulk Density (g/cm³) | Tap Density (g/cm³) |
|---|---|---|---|---|---|---|
| 1 | 665 | 0.050 | 0.296 | 3.7 | 0.39 | 0.42 |
| 2 | 567 | 0.056 | 0.237 | 3.3 | 0.47 | 0.47 |
| 3 | 997 | 0.141 | 0.410 | 4.1 | 0.24 | 0.26 |
| 4 | 762 | 0.105 | 0.293 | 3.4 | 0.55 | 0.55 |
| 8 | 588 | 0.240 | 0.277 | 2.5 | 0.26 | 0.26 |
| 9 | 634 | 0.031 | 0.299 | 2.1 | 0.38 | 0.38 |

As shown in Table 2, the carbon sorbent 1 and carbon sorbent 2 exhibited a density of at least about 0.35 g/cm³. Carbon sorbent 2 had a bulk density greater than 0.45 g/cm³.

In addition to the properties shown in Table 2, the $CO_2$ capacity and the water loading of carbon sorbents 1 through 4 were measured, as shown in Table 3. The $CO_2$ capacity was measured by exposing the carbon sorbents to a gas stream including 15 volume percent $CO_2$ and 85 volume nitrogen gas ($N_2$) at the noted temperatures. The partial pressure of $CO_2$ was 114 mmHg. In Table 3, the water loading was measured by exposing the carbon sorbents to a stream having the noted relative humidity at the noted temperatures.

As shown in Table 3, carbon sorbent 1 and 2 that were formed with the processing aid and glycine exhibited a higher $CO_2$ capacity compared to carbon sorbents 3 and 4 that were formed from melamine and without a processing aid.

TABLE 3

| Carbon Sorbent Formulation | $CO_2$ Capacity wt % at 760 mmHg $CO_2$ | | $CO_2$ Capacity wt % at 114 mmHg $CO_2$ | | Water Loading wt % 25% RH | | Water Loading wt % 50% RH | |
|---|---|---|---|---|---|---|---|---|
| | 30° C. | 60° C. | 30° C. | 60° C. | 0° C. | 25° C. | 0° C. | 25° C. |
| 1 | 11.77 | 7.43 | 4.04 | 2.07 | 1.63 | 1.55 | 20.93 | 20.37 |
| 2 | 10.31 | 6.38 | 3.36 | 1.65 | 2.27 | 2.00 | 18.75 | 18.20 |
| 3 | 10.21 | 5.97 | 2.91 | 1.41 | 2.35 | 2.12 | 24.40 | 21.93 |
| 4 | 8.27 | 4.89 | 2.35 | 1.13 | 0.36 | 0.54 | 8.15 | 6.74 |

Table 4 shows the isostatic heat of adsorption of carbon dioxide, water, oxygen, and nitrogen was measured for carbon sorbents 1 through 4.

TABLE 4

| Carbon Sorbent Formulation | Heat of Adsorption (kJ/mol) | | | |
|---|---|---|---|---|
| | $N_2$ | $O_2$ | $CO_2$ | $H_2O$ |
| 1 | 17.55 | 14.54 | 27.64 | 45.51 |
| 2 | 18.71 | — | 27.08 | 45.31 |
| 3 | 14.89 | 13.88 | 27.19 | 44.24 |
| 4 | 17.82 | — | 26.20 | 44.26 |

Example 2

Different carbon sorbent formulations were prepared using different nitrogen-containing materials. Surfaces of the carbon sorbent formulations were analyzed using X-ray photoelectron spectroscopy (XPS) to determine the elemental composition on the surface of the carbon sorbent formulations. The elemental composition on the surface of the carbon sorbent is exclusive of hydrogen (e.g., the XPS cannot detect hydrogen). Table 5A below shows the elemental composition of the surface of the carbon sorbent formulations exclusive of hydrogen and shows the nitrogen-containing material used during the production of the carbon sorbent formulations. In Table 5A below, carbon sorbent formulations 1 through 4, 8, and 9 are the same as carbon sorbent formulations 1-4, 8, and 9 of Example 1, respectively.

TABLE 5A

| Carbon Sorbent Formulation | Nitrogen-containing Material | C (at. %) | N (at. %) | O (at. %) | S (at. %) | P (at. %) |
|---|---|---|---|---|---|---|
| 1, 2 | Glycine | 92.5 | 2.2 | 5.3 | 0 | 0 |
| 3, 4 | Melamine | 95.9 | 0.9 | 3.2 | 0 | 0 |
| 5 | Ammonium Sulfate | 91.8 | 2.5 | 4.9 | 0.8 | 0 |
| 6 | Ammonium | 83.7 | 4.6 | 9.9 | 0 | 1.8 |

TABLE 5A-continued

| Carbon Sorbent Formulation | Nitrogen-containing Material | C (at. %) | N (at. %) | O (at. %) | S (at. %) | P (at. %) |
|---|---|---|---|---|---|---|
| 7 | Phosphate Melamine | 94.9 | 2.2 | 2.9 | 0 | 0 |
| 8 | Guanidine | 92.7 | 2.7 | 4.6 | 0 | 0 |
| 9 | Glycine | 92.4 | 2.4 | 5.2 | 0 | 0 |

As shown in Table 5A, not including hydrogen, the carbon sorbents 1 and 2 that were formed with glycine (and with the processing aid) included greater than about 2.0 atomic percent nitrogen and greater than about 5.0 atomic percent oxygen on the surface thereof. Carbon sorbents 3 and 4, formed from melamine, included a lower atomic percent of nitrogen and, as shown in Example 1, exhibited different carbon loading capacities than carbon sorbents 1 and 2. Accordingly, the surface composition of the carbon sorbents may affect the $CO_2$ capacity of the carbon sorbents (e.g., since the $CO_2$ adsorption is a surface phenomenon). Carbon sorbent 6 included less than about 90.0 atomic percent carbon and greater than 5.0 atomic percent oxygen (e.g., greater than about 7.0 atomic percent, greater than about 8.0 atomic percent, or greater than about 9.0 atomic percent oxygen), the atomic percents exclusive of hydrogen.

Table 5B shows the relative weight percents of each of carbon, nitrogen, oxygen, sulfur, and phosphorous at the surface of the carbon sorbent formulations. The weight percents are exclusive of hydrogen.

TABLE 5B

| Carbon Sorbent Formulation | C (wt. %) | N (wt. %) | O (wt. %) | S (wt. %) | P (wt. %) |
|---|---|---|---|---|---|
| 1, 2 | 90.6 | 2.51 | 6.91 | 0 | 0 |
| 3, 4 | 94.8 | 1.04 | 4.21 | 0 | 0 |
| 5 | 88.8 | 2.82 | 6.32 | 2.07 | 0 |
| 6 | 78.3 | 5.02 | 12.34 | 0 | 4.34 |
| 7 | 93.7 | 2.53 | 3.81 | 0 | 0 |
| 8 | 90.9 | 3.09 | 6.01 | 0 | 0 |
| 9 | 90.5 | 2.74 | 6.78 | 0 | 0 |

The relative compositions of the oxygen species, the carbon species, and the nitrogen species on the surface of the carbon sorbents was measured using XPS and are shown in Table 6 through Table 8 below. Table 6 shows the type of covalent bonds formed by the oxygen atoms of the oxygen species on the surface of the carbon sorbent. In Table 6, O—C represents the atomic percent of oxygen atoms on the surface of the carbon sorbent that is single bonded to a carbon atom; and O═C represents the atomic percent of oxygen atoms on the surface of the carbon sorbent that is double bonded to a carbon atom.

TABLE 6

| Carbon Sorbent Formulation | O—C (at. %) | O═C (at. %) |
|---|---|---|
| 1, 2 | 56.0 | 44.0 |
| 3, 4 | 62.5 | 37.5 |
| 5 | 53.0 | 47.0 |
| 6 | 53.0 | 47.0 |
| 7 | 72.2 | 27.8 |

TABLE 6-continued

| Carbon Sorbent Formulation | O—C (at. %) | O═C (at. %) |
|---|---|---|
| 8 | 64.6 | 35.4 |
| 9 | 62.4 | 37.6 |

With reference to Table 6, fewer than about 60 atomic percent of oxygen atoms at the surface of carbon sorbents 1, 2, 5, and 6 were single bonded to a carbon atom, while greater than about 40 atomic percent of the oxygen atoms at the surface were double bonded to an oxygen atom. Such carbon sorbents also included greater than about 2.0 atomic percent nitrogen at the surface.

Table 7 below shows the atomic percent of carbon atoms on the surface of the carbon sorbent that are covalently bonded to different atoms. In Table 7, C—C, C—H, C—S, and C—P represent a carbon atom single bonded to another carbon atom, hydrogen, sulfur, or phosphorus, respectively; C—O and C—N represent carbon atoms single bonded to oxygen and nitrogen, respectively; C═O and N—C═O respectively represent a carbon atom double bonded to an oxygen atom or a carbon atom single bonded to an oxygen atom and a nitrogen atom; O—C═O and N—C═O represent a carbon atom double bonded to oxygen and single bonded to either another oxygen atom or a nitrogen atom, respectively; and pi-pi represents the atomic percent of carbon atoms on the surface of the carbon sorbent that are conjugated.

TABLE 7

| Carbon Sorbent Formulation | C—C, C—H, C—S, C—P (at. %) | C—O, C—N (at. %) | C═O, N—C—O (at. %) | O—C═O, N—C═O (at. %) | pi-pi |
|---|---|---|---|---|---|
| 1, 2 | 62.5 | 12.6 | 7.6 | 3.1 | 14.2 |
| 3, 4 | 68.3 | 12.4 | 6.7 | 2.6 | 10.0 |
| 5 | 82.0 | 14.0 | 4.0 | — | — |
| 6 | 75.4 | 19.0 | 5.6 | — | — |
| 7 | 60.2 | 14.3 | 7.5 | 3.4 | 14.7 |
| 8 | 63.7 | 13.4 | 8.2 | 3.5 | 11.3 |
| 9 | 60.7 | 14.9 | 8.4 | 2.6 | 13.4 |

As shown in Table 7, greater than about 2.0 atomic percent (e.g., greater than about 3.0 atomic percent) of the carbon atoms on the surface of carbon sorbents 1 and 2 were double bonded to an oxygen atom and single bonded to one of another oxygen atom or a nitrogen atom. In addition, the surface of carbon sorbent formulations 1, 2, 3, 4, and 7 included conjugated carbon, indicative of the presence of graphite-like carbon bonding, which occurs only when there is sufficient π-bond conjugation to allow for π and π* orbitals to form in a sufficiently large area.

Table 8 shows the types of covalent bonds of the nitrogen species on the surface of the carbon sorbent. With reference to Table 8, carbon sorbents 1 and 2 included greater than 2.0 pyridone and/or pyrrole groups for every 1.0 pyridine group at the surface. The ratio of the pyridone and/or pyrrole to pyridine was influenced by the nitrogen-containing material in the feed material from which the carbon sorbents were formed. Carbon sorbents formed from nitrogen-containing materials including only melamine (e.g., carbon formulations 3, 4, and 7) did not include pyridine at the surface. None of the carbon sorbents included nitrogen at the surface that was quaternary or oxidized. Carbon formulation 6 exhibited nitrogen to phosphorous single bonds at the surface due the ammonium phosphate in the nitrogen-containing material.

TABLE 8

| Carbon Sorbent Formulation | Pyridone and/or Pyrrole (at. %) | Pyridine (at. %) | N—P (at. %) |
|---|---|---|---|
| 1, 2 | 74.3 | 25.7 | 0.0 |
| 3, 4 | 100 | 0.0 | 0.0 |
| 5 | 66.0 | 34.0 | 0.0 |
| 6 | 50.0 | 24.0 | 31.0 |
| 7 | 100.0 | 0.0 | 0.0 |
| 8 | 68.9 | 31.1 | 0.0 |
| 9 | 63.6 | 36.4 | 0.0 |

Example 3

Figure 4A:
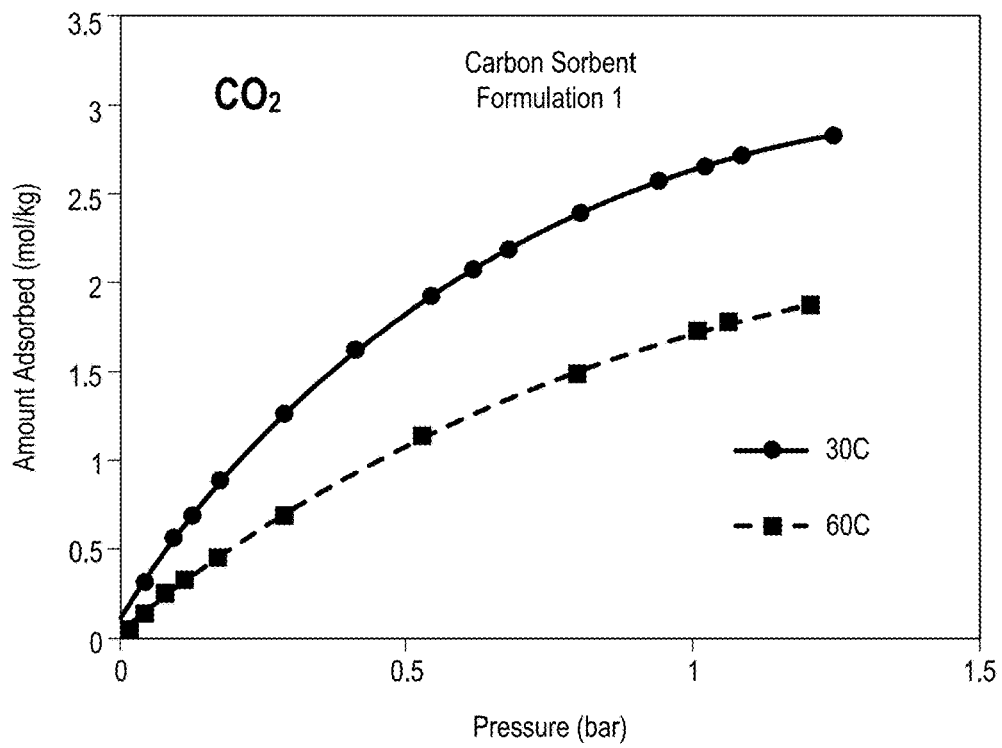
FIG. 4A through FIG. 4C are graphs illustrating the isothermal carbon dioxide capacity of different carbon sorbent formulations.
Figure 4B:
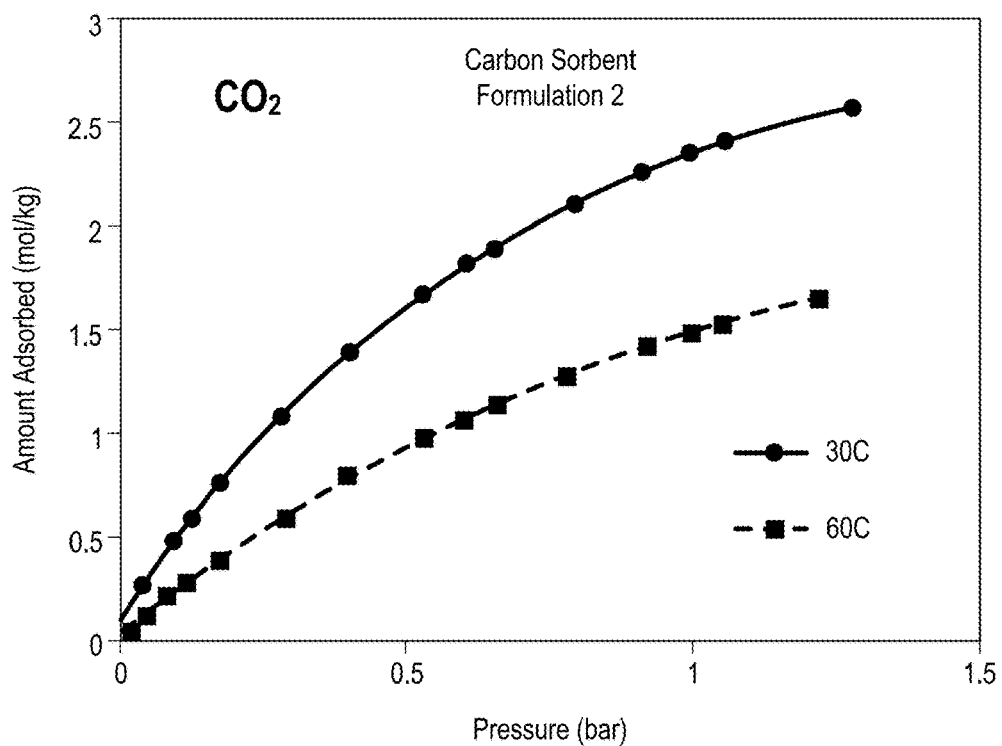
Figure 4C:
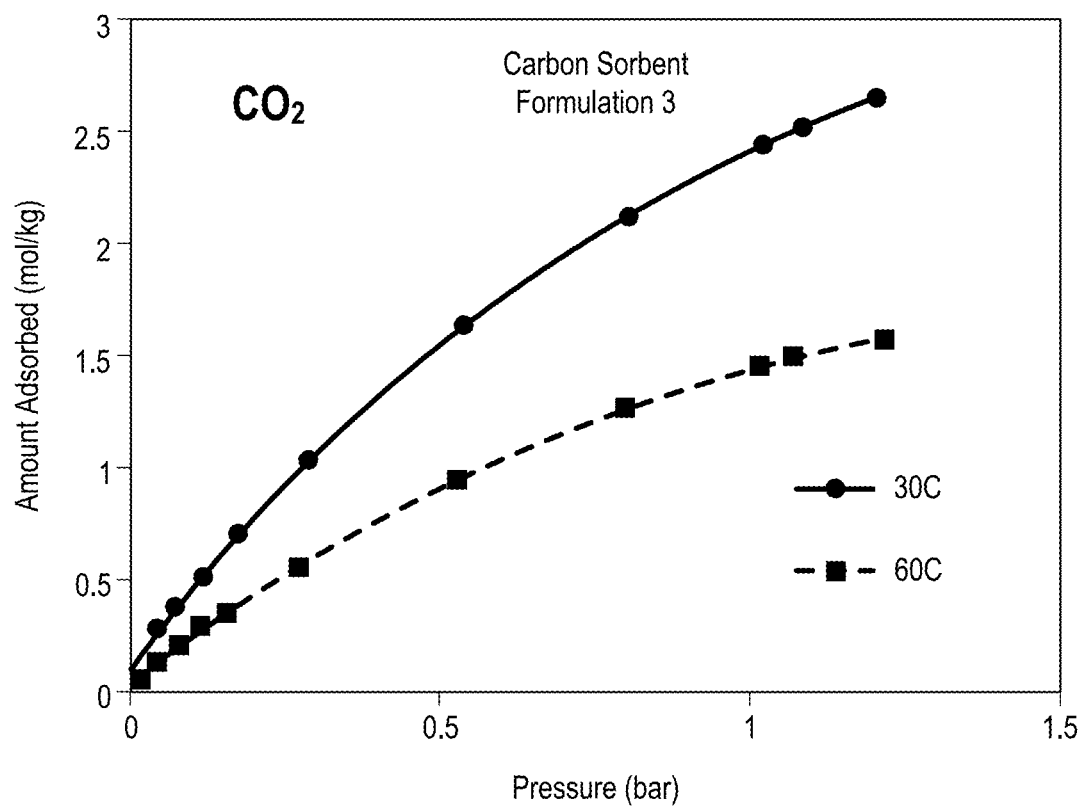

The adsorption properties of carbon sorbents 1, 2, and 3 were measured. FIG. 4A is a graph illustrating the isothermal $CO_2$ capacity of carbon sorbent 1; FIG. 4B is a graph illustrating the isothermal $CO_2$ capacity of carbon sorbent 2; and FIG. 4C is a graph illustrating the isothermal $CO_2$ capacity of carbon sorbent 3. With reference to FIG. 4A through FIG. 4C, carbon sorbent formulation 1 exhibited a higher $CO_2$ capacity than carbon sorbent 2 and carbon sorbent 3 at each pressure at 30° C. and 60° C. In addition, carbon sorbent 2 exhibited a higher $CO_2$ capacity than carbon sorbent 3 at each pressure at 30° C. and 60° C.

Figure 5A:
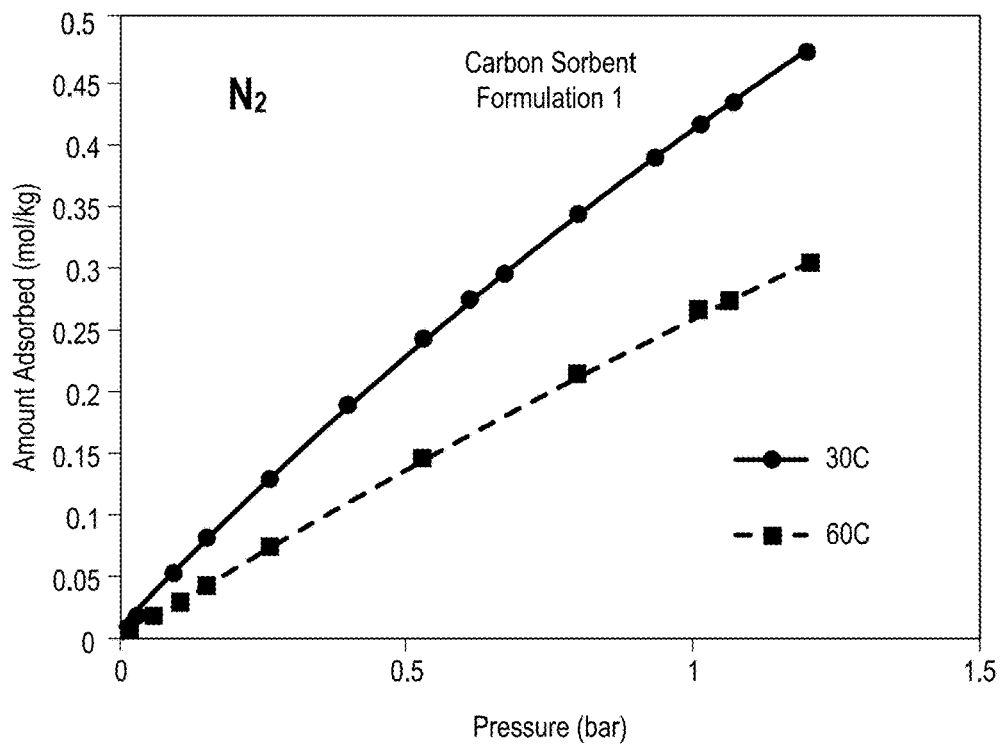
FIG. 5A through FIG. 5C are graphs illustrating the isothermal nitrogen capacity of the carbon sorbent formulations.
Figure 5B:
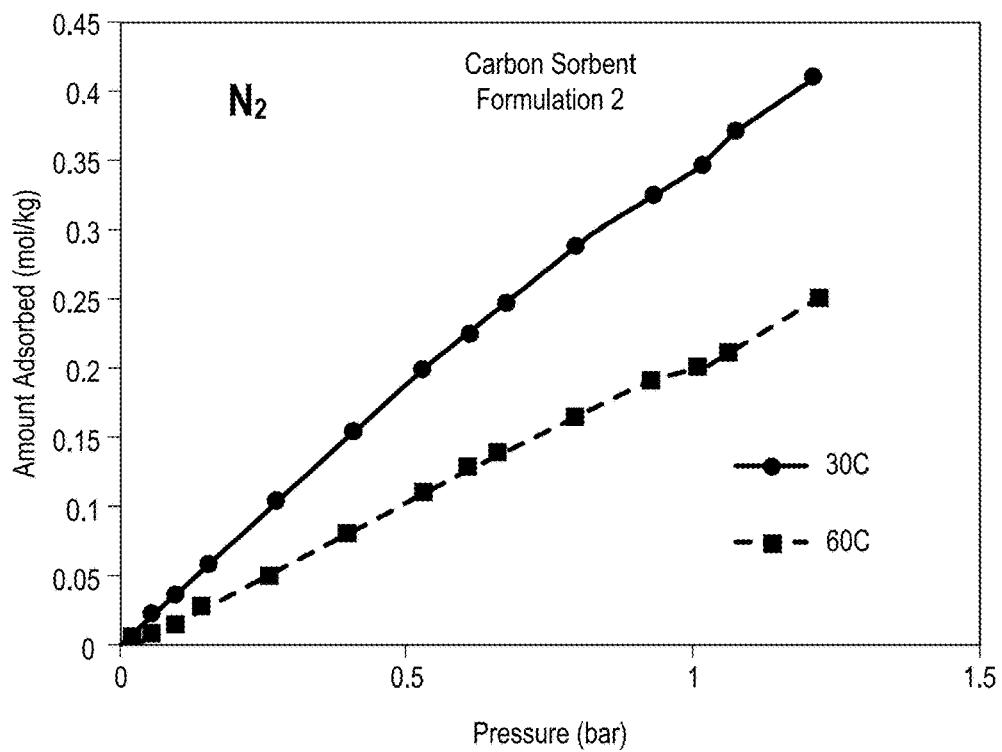
Figure 5C:
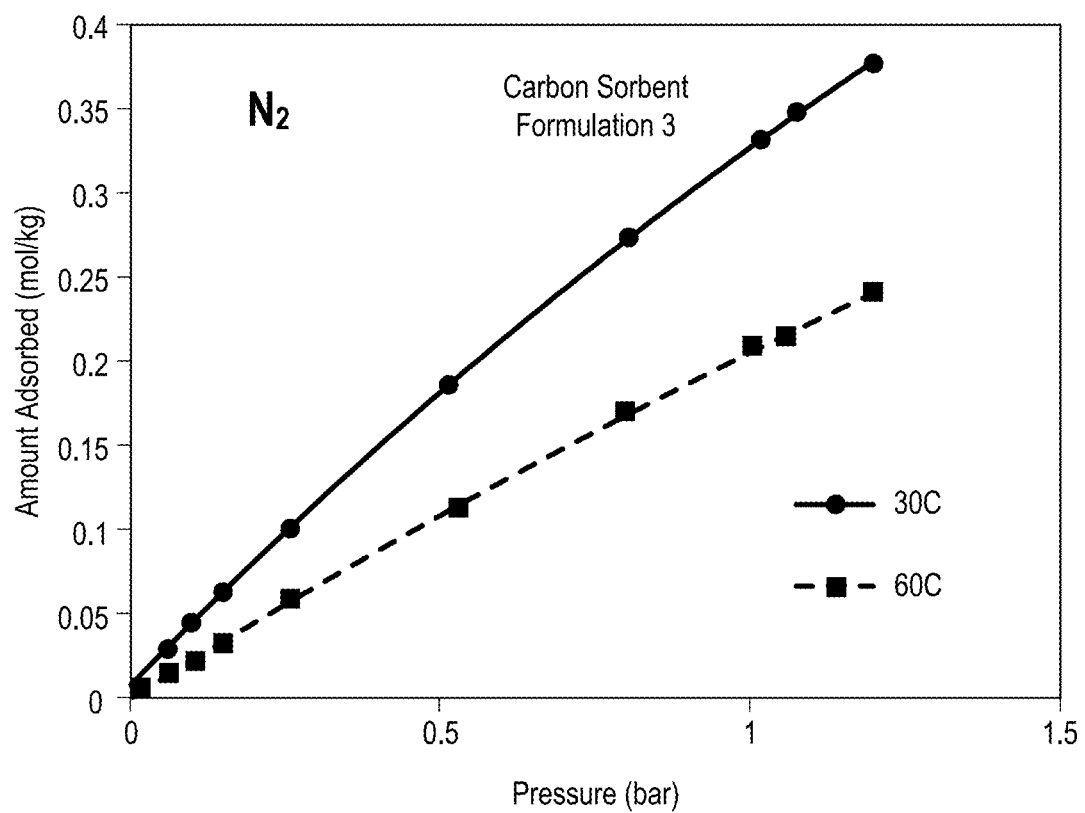

FIG. 5A is a graph illustrating the isothermal nitrogen capacity of carbon sorbent 1; FIG. 5B is a graph illustrating the isothermal nitrogen capacity of carbon sorbent 2; and FIG. 5C is a graph illustrating the isothermal nitrogen capacity of carbon sorbent 3. With collective reference to FIG. 5A through FIG. 5C, the carbon sorbent formulations appear to exhibit relatively similar nitrogen adsorption capacities.

Table 9 below shows the IAST selectivity of some of the carbon sorbent formulations to carbon dioxide relative to nitrogen at 30° C. and 60° C. The carbon sorbents were exposed to a gas including 15 volume percent carbon dioxide, the remaining portion of the gas including nitrogen.

TABLE 9

| Carbon Sorbent Formulation | IAST selectivity to $CO_2$ relative to $N_2$ at 30° C. | IAST selectivity to $CO_2$ relative to $N_2$ at 60° C. |
|---|---|---|
| 1 | 14.40 | 11.79 |
| 2 | 14.07 | 11.80 |
| 3 | 14.03 | 11.02 |
| 6 | 23.57 | 19.01 |
| 8 | 18.05 | 17.16 |
| 9 | 14.72 | 12.81 |

Figure 6A:
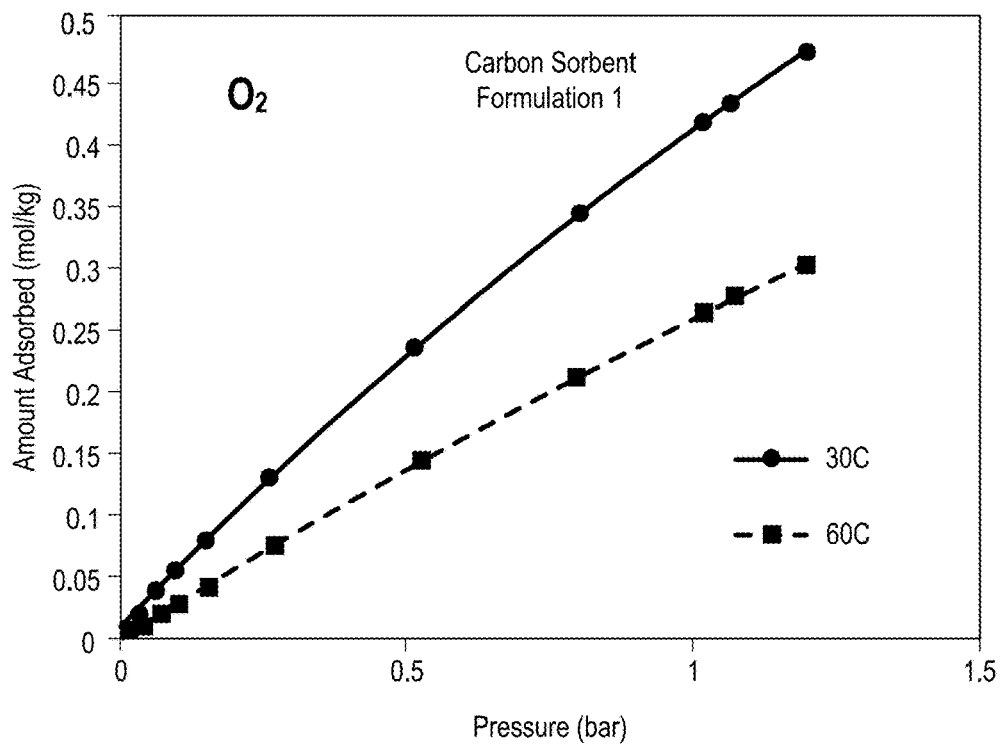
FIG. 6A and FIG. 6B are graphs illustrating the isothermal oxygen capacity of the carbon sorbent formulations.
Figure 6B:
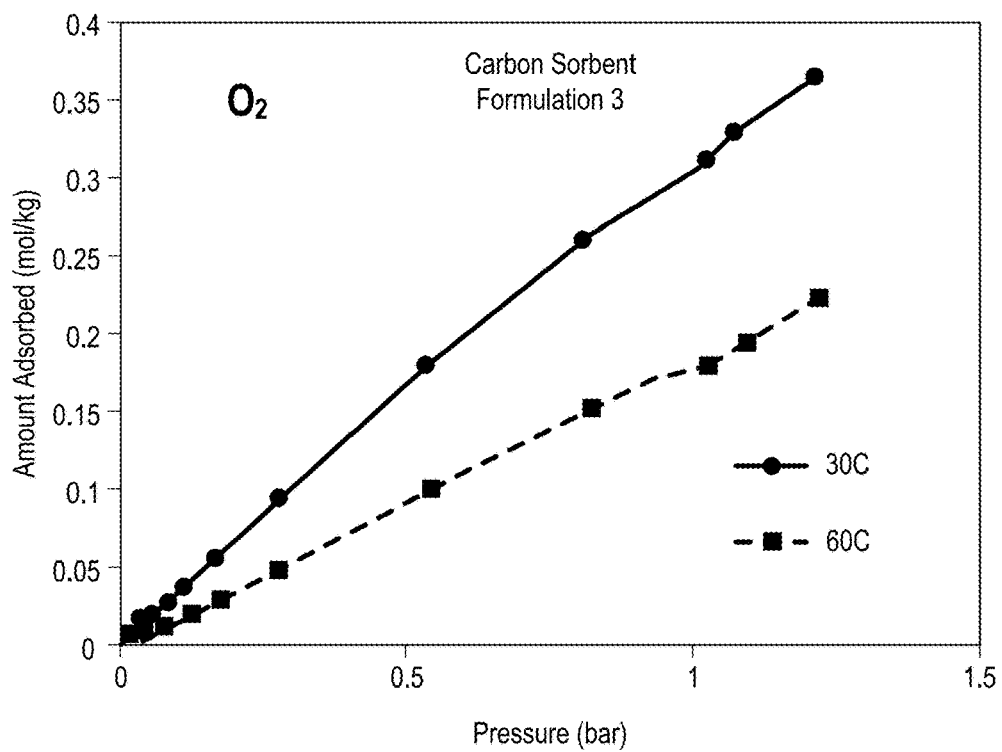

FIG. 6A is a graph illustrating the isothermal oxygen capacity of carbon sorbent 1; and FIG. 6B is a graph illustrating the isothermal oxygen capacity of carbon sorbent 3. With reference to FIG. 6A and FIG. 6B, the carbon sorbent 1 appears to adsorb slightly more oxygen than carbon sorbent 3.

Figure 7A:
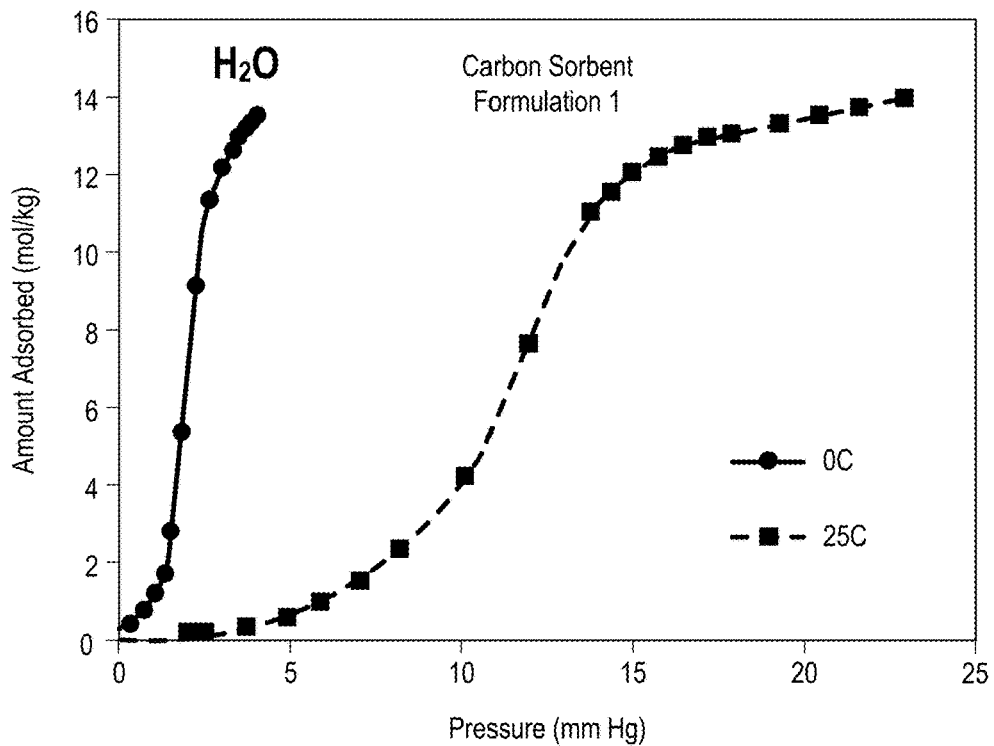
FIG. 7A through FIG. 7C are graphs illustrating water adsorption isotherms of the carbon sorbent formulations as a function of pressure.
Figure 7B:
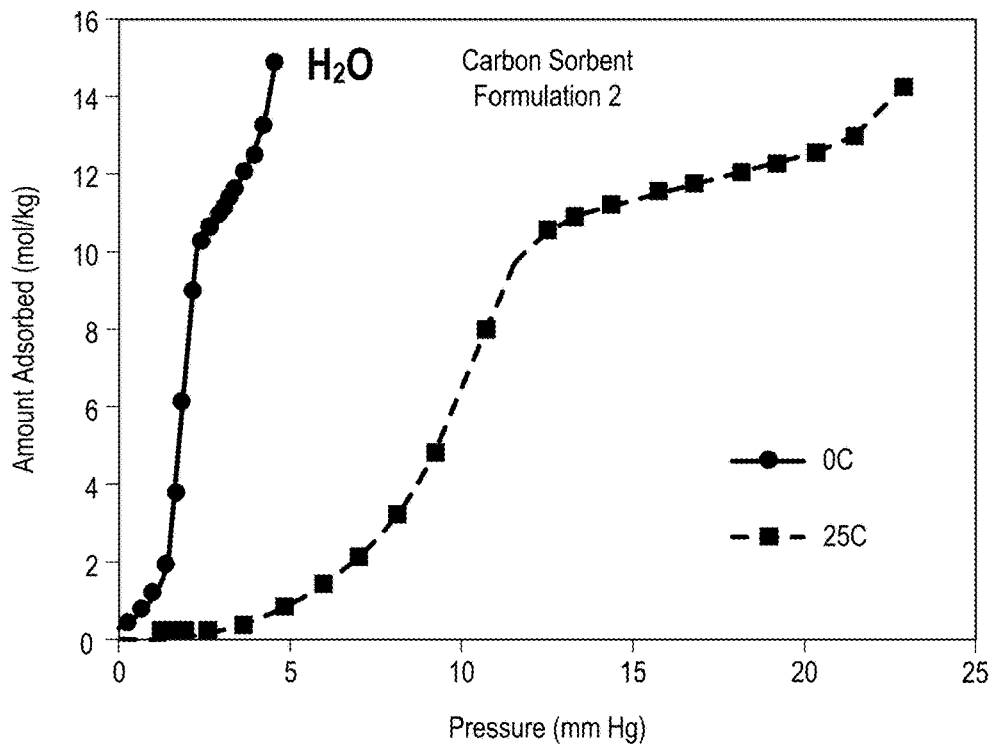
Figure 7C:
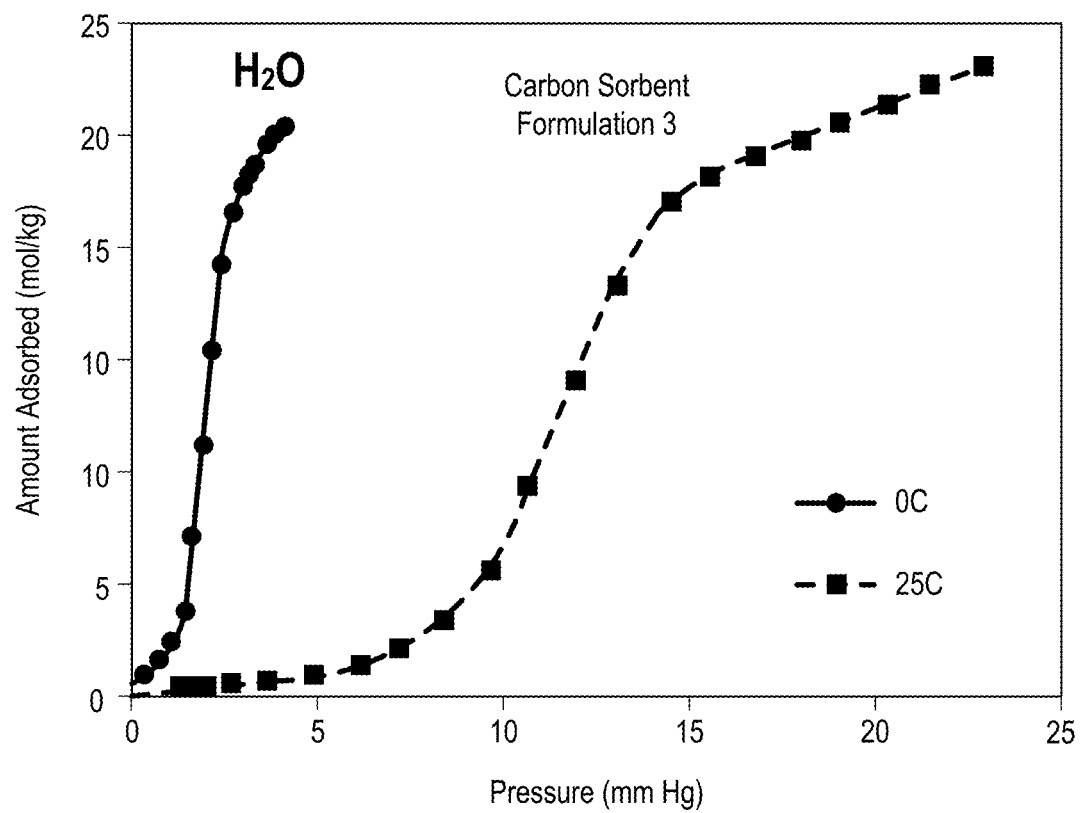

FIG. 7A is a graph illustrating water adsorption isotherms of carbon sorbent 1 at 0° C. and 25° C. as a function of pressure; FIG. 7B is a graph illustrating water adsorption isotherms of carbon sorbent 2 at 0° C. and 25° C. as a function of pressure; and FIG. 7C is a graph illustrating water adsorption isotherms of carbon sorbent 3 at 0° C. and 25° C. as a function of pressure. With collective reference to FIG. 7A through FIG. 7C, carbon sorbents 1 and 2 appear to absorb substantially less water than carbon sorbent 3 at 0° C. and 25° C., indicating that carbon sorbents 1 and 2 include additional capacity for $CO_2$ adsorption compared to carbon sorbent 3.

Figure 8A:
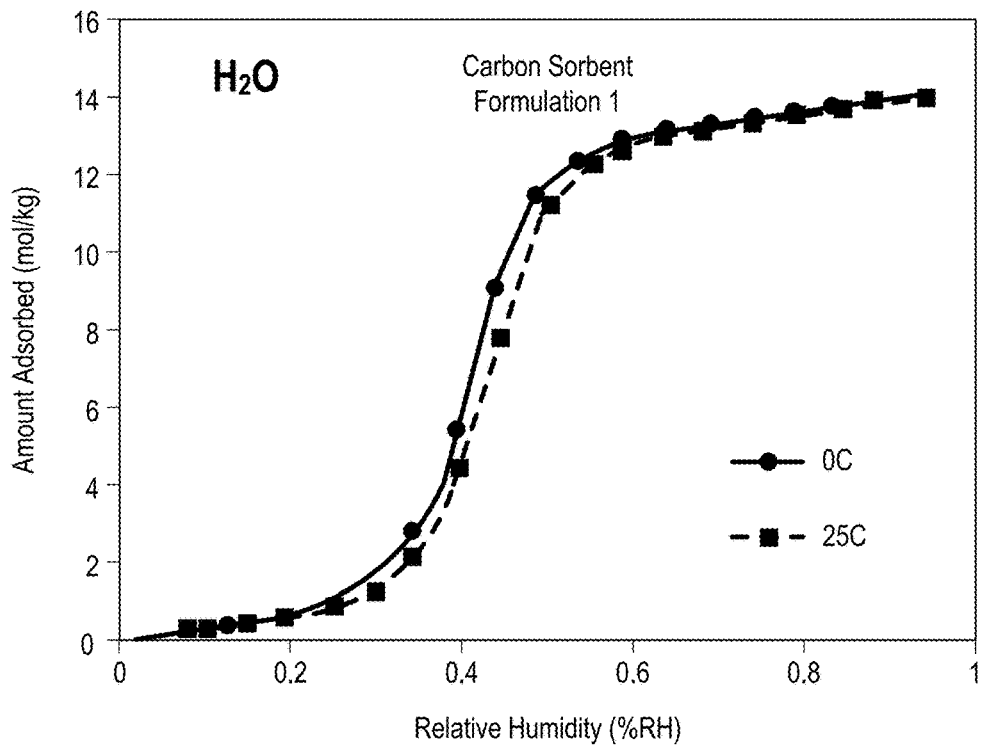
FIG. 8A through FIG. 8C are graphs illustrating water adsorption isotherms of the carbon sorbent formulations as a function of relative humidity.
Figure 8B:
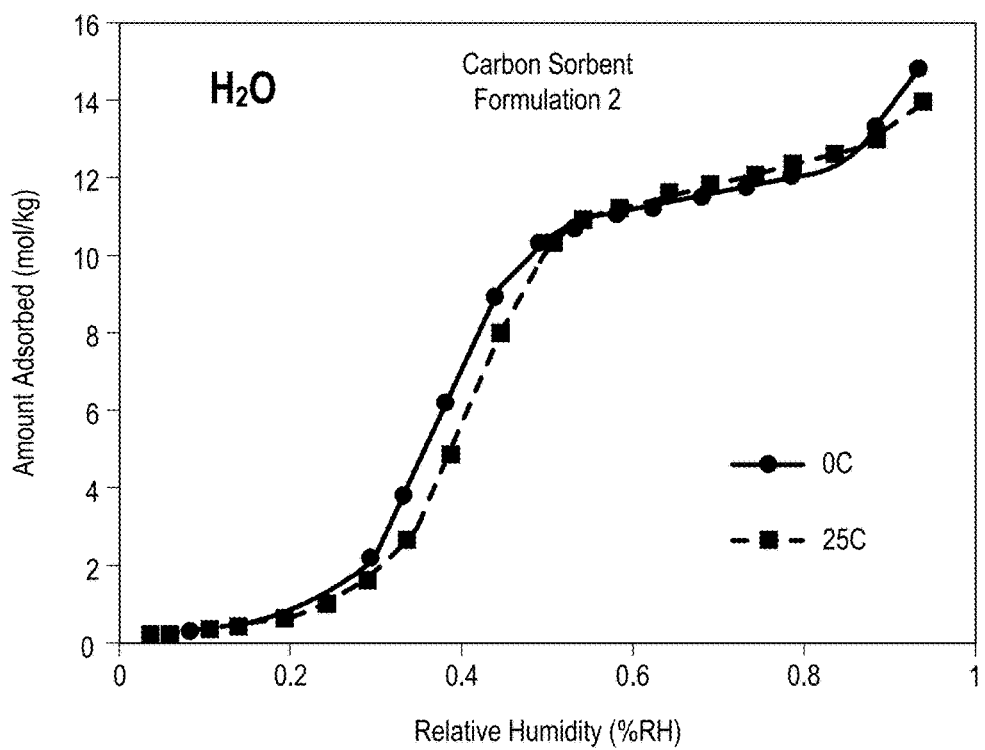
Figure 8C:
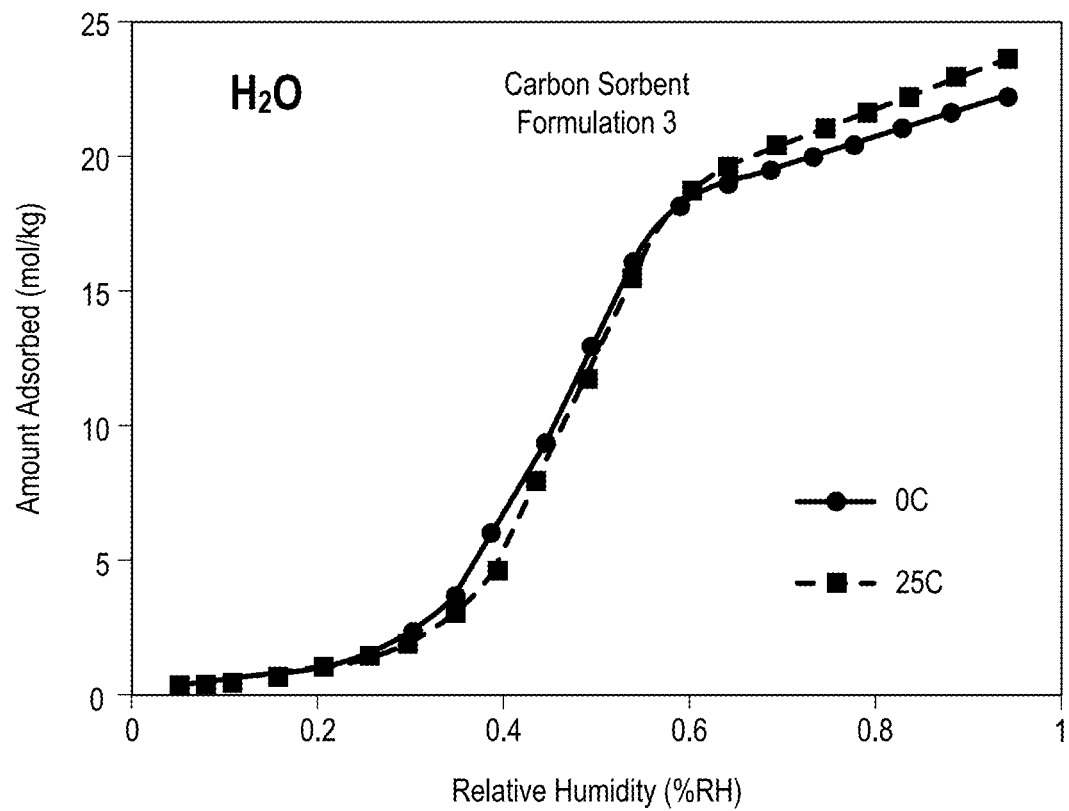

FIG. 8A is a graph illustrating water adsorption isotherms of carbon sorbent 1 at 0° C. and 25° C. as a function of relative humidity; FIG. 8B is a graph illustrating water adsorption isotherms of carbon sorbent 2 at 0° C. and 25° C. as a function of relative humidity; and FIG. 8C is a graph illustrating water adsorption isotherms of carbon sorbent 3 at 0° C. and 25° C. as a function of relative humidity. With collective reference to FIG. 8A through FIG. 8C, the carbon sorbents 1 and 2 appear to absorb substantially less water than carbon sorbent 3 at 0° C. and 25° C., indicating that carbon sorbents 1 and 2 include additional capacity for $CO_2$ adsorption compared to carbon sorbent 3.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A carbon sorbent for removal of carbon dioxide from a gaseous material, the carbon sorbent comprising:
    a carbon content of at least about 90.0 atomic percent at a surface of the carbon sorbent and a nitrogen content of at least about 2.0 atomic percent at the surface of the carbon sorbent, the carbon content and the nitrogen content exclusive of hydrogen,
    at least 70 atomic percent of the nitrogen at the surface of the carbon sorbent comprising at least one of pyridone or pyrrole, at least some of the nitrogen at the surface of the carbon sorbent comprising pyridine,
    greater than about 2.0 atomic percent of carbon atoms at the surface of the carbon sorbent double bonded to an oxygen atom and single bonded to one of another oxygen atom or a nitrogen atom.

2. The carbon sorbent of claim 1, wherein greater than about 20 atomic percent of the nitrogen at the surface of the carbon sorbent comprises pyridine.

3. The carbon sorbent of claim 1, wherein the surface of the carbon sorbent comprising at least one of:
    an oxygen content at, exclusive of hydrogen, of at least about 4.0 weight percent; or
    a carbon content, exclusive of hydrogen, of at least about 92.0 weight percent.

4. The carbon sorbent of claim 1, wherein less than about 65 atomic percent of carbon atoms at the surface of the carbon sorbent are single bonded to another carbon atom or a hydrogen atom.

5. The carbon sorbent of claim 1, wherein at least about 10.0 atomic percent of carbon atoms at the surface of the carbon sorbent are conjugated.

6. The carbon sorbent of claim 1, wherein the carbon sorbent exhibits a carbon dioxide capacity greater than about 10.50 weight percent at about 30° C. and a partial pressure of carbon dioxide of about 760 mmHg.

7. The carbon sorbent of claim 1, wherein the carbon sorbent exhibits a BET surface area from about 500 $m^2/g$ to about 700 $m^2/g$.

8. The carbon sorbent of claim 1, wherein the carbon sorbent has a BJH average pore width within a range of from about 3.0 to about 4.0 nm.

9. The carbon sorbent of claim 1, wherein the carbon sorbent exhibits a selectivity of carbon dioxide to nitrogen greater than about 11.0:1 at about 60° C. and about 760 mmHg total pressure when exposed to a gas including about 15 volume percent carbon dioxide and about 85 volume percent nitrogen.

10. A carbon sorbent for removal of carbon dioxide from a gaseous material, the carbon sorbent comprising:
    at least 2.0 atomic percent nitrogen at a surface of the carbon sorbent, a ratio of pyridone and pyrrole to pyridine at the surface greater than about 2.0:1.0;
    at least 3.0 atomic percent oxygen at the surface of the carbon sorbent, the atomic percent nitrogen and the atomic percent of oxygen exclusive of hydrogen at the surface of the carbon sorbent; and
    greater than about 2.0 atomic percent of carbon atoms of the carbon sorbent at the surface double bonded to an oxygen atom and single bonded to one of another oxygen atom or a nitrogen atom.

11. The carbon sorbent of claim 10, wherein greater than about 70.0 atomic percent of the nitrogen atoms at the surface are part of a pyridone or pyrrole structure.

12. The carbon sorbent of claim 10, wherein the surface of the carbon sorbent, exclusive of hydrogen, comprises greater than about 5.0 atomic percent oxygen.

13. The carbon sorbent of claim 10, wherein the surface of the carbon sorbent comprises carbon atoms single bonded to a nitrogen atom and double bonded to an oxygen atom.

14. The carbon sorbent of claim 10, wherein:
    the carbon sorbent has a BET surface area greater than about 500 $m^2/g$ to about 700 $m^2/g$; and
    the surface of the carbon sorbent has a nitrogen content greater than about 2.0 atomic percent and an oxygen content greater than about 3.0 atomic percent.

* * * * *